(12) United States Patent
Ikeda et al.

(10) Patent No.: US 11,284,047 B2
(45) Date of Patent: Mar. 22, 2022

(54) INFORMATION PROCESSING DEVICE AND INFORMATION PROCESSING METHOD

(71) Applicant: SONY CORPORATION, Tokyo (JP)

(72) Inventors: Takuya Ikeda, Tokyo (JP); Fumihiko Iida, Kanagawa (JP); Kentaro Ida, Tokyo (JP); Seiji Suzuki, Kanagawa (JP); Ryuichi Suzuki, Tokyo (JP)

(73) Assignee: SONY CORPORATION, Tokyo (JP)

(*) Notice: Subject to any disclaimer, the term of this patent is extended or adjusted under 35 U.S.C. 154(b) by 9 days.

(21) Appl. No.: 16/637,423

(22) PCT Filed: May 24, 2018

(86) PCT No.: PCT/JP2018/020035
§ 371 (c)(1),
(2) Date: Feb. 7, 2020

(87) PCT Pub. No.: WO2019/035256
PCT Pub. Date: Feb. 21, 2019

(65) Prior Publication Data
US 2020/0228763 A1  Jul. 16, 2020

(30) Foreign Application Priority Data
Aug. 18, 2017  (JP) .............................. JP2017-157746

(51) Int. Cl.
*H04N 9/31* (2006.01)

(52) U.S. Cl.
CPC ................................ *H04N 9/3102* (2013.01)

(58) Field of Classification Search
CPC .. G04N 9/3102; H04N 9/3102; H04N 9/3194; H04N 9/3141; H04N 9/31; G06F 3/017; G06F 3/0346; G06F 3/167
(Continued)

(56) References Cited

U.S. PATENT DOCUMENTS

| 5,986,567 A | 11/1999 | Shima | |
| 2013/0128240 A1* | 5/2013 | Yoshida | H04N 9/3155 353/85 |
| 2016/0337626 A1* | 11/2016 | Mima | H04N 9/3194 |

FOREIGN PATENT DOCUMENTS

| CN | 1147748 A | 4/1997 |
| GB | 2305278 A | 4/1997 |

(Continued)

OTHER PUBLICATIONS

Takahasi, et al., "Development a Mobile Robot that Interacts with Human Users with Information Projection—Basic System", Proceedings of the 28th Annual Conference of the Robotics Society of Japan DVD-ROM, Sep. 24, 2010, pp. 904-907. (Translation of abstract only).

(Continued)

*Primary Examiner* — Sherrie Hsia
(74) *Attorney, Agent, or Firm* — Chip Law Group

(57) ABSTRACT

An information processing device including a recognition unit that recognizes a projection environment in space on the basis of sensor data obtained by sensing the space in which content is projected, and an inducement control unit that presents, to a user, inducement information to change a state of the projection environment from the recognized first projection environment state to a second projection environment state with improved visibility.

15 Claims, 24 Drawing Sheets

(58) Field of Classification Search
USPC .......................... 348/739, 744; 345/156, 158
See application file for complete search history.

(56) References Cited

FOREIGN PATENT DOCUMENTS

| | | |
|---|---|---|
| JP | 09-084074 A | 3/1997 |
| JP | 2014-095891 A | 5/2014 |
| JP | 2015-026024 A | 2/2015 |
| KR | 10-0222810 B1 | 10/1999 |
| TW | 384625 B | 3/2000 |

OTHER PUBLICATIONS

Takahashi, et al., "Development a Mobile Robot that Interacts with Human Users with Information Projection—Basic System", Proceedings of the 28th Annual Conference of the Robotics Society of Japan DVD-ROM, Sep. 24, 2010, pp. 904-907.

International Search Report and Written Opinion of PCT Application No. PCT/JP2018/020035, dated Aug. 14, 2018, 10 pages of ISRWO.

\* cited by examiner

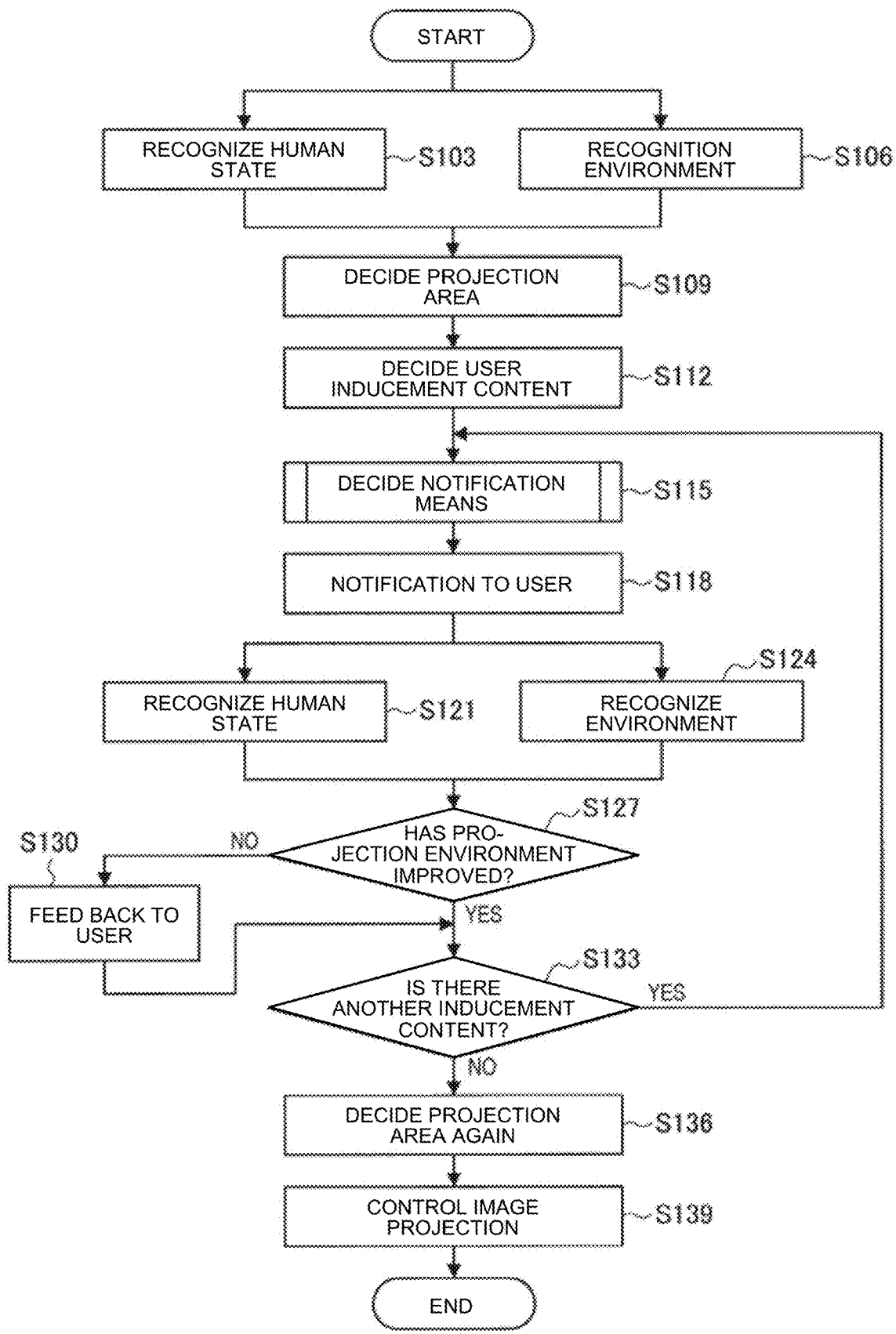

FIG.6

| LARGE CATEGORY | CATEGORY | FACTOR | INDUCEMENT CONTENT | PRIORITY | PRIORITY DETERMINATION FORMULA | NOTIFICATION MEANS |
|---|---|---|---|---|---|---|
| HUMAN | VIEWING/LISTENING DISTANCE | VIEWING/LISTENING DISTANCE | CAUSE USER TO MOVE TO OPTIMAL VIEWING/LISTENING POSITION WITH RESPECT TO PROJECTION POSITION | HIGH | FORMULA 1a | ·PRESENT VIEWING/LISTENING POSITION |
| | | | | LOW | FORMULA 1b | ·PRESENT INDUCING WORDING IN DIRECTION OF LINE OF SIGHT OF USER<br>·PRESENT BY AUDIO |
| | ANGLE BETWEEN VIEWING/LISTENING DIRECTION OF HUMAN AND PROJECTION PLANE NORMAL (ORIENTATION OF PLANE TO HUMAN) | ANGULAR DIFFERENCE OF PROJECTION PLANE | GUIDE USER TO POSITION IN PERPENDICULAR DIRECTION FROM PROJECTION PLANE | HIGH | FORMULA 1a | ·PRESENT VIEWING/LISTENING POSITION |
| | | | | LOW | FORMULA 1b | ·PRESENT INDUCING WORDING IN DIRECTION OF LINE OF SIGHT OF USER<br>·PRESENT BY AUDIO |
| | ANGLE FROM ORIENTATION OF HUMAN TO PROJECTION LOCATION (FIELD OF VIEW) | ANGULAR DIFFERENCE OF PROJECTION PLANE | CAUSE USER TO FACE PROJECTION LOCATION | HIGH | FORMULA 1a | ·MOVE UI FROM DIRECTION OF LINE OF SIGHT OF USER TO PROJECTION LOCATION |
| | | | | LOW | FORMULA 1b | ·PRESENT INDUCING WORDING IN DIRECTION OF LINE OF SIGHT OF USER<br>·PRESENT BY AUDIO |

FIG. 7

| LARGE CATEGORY | CATEGORY | FACTOR | INDUCEMENT CONTENT | PRIORITY | PRIORITY DETERMINATION FORMULA | NOTIFICATION MEANS |
|---|---|---|---|---|---|---|
| ENVIRONMENT | PROJECTION PLANE | SHADOWING OBJECT TO PROJECTION PLANE | INDICATE SHADOWING OBJECT AND CAUSE USER TO EXCLUDE SHADOWING OBJECT | HIGH | FORMULA 2a | • PRESENT UI TO EXCLUDE SHADOWING OBJECT |
| | | | | LOW | FORMULA 2b | • PRESENT INDUCING WORDING IN DIRECTION OF LINE OF SIGHT OF USER<br>• PRESENT BY AUDIO |
| | | OBSTACLE ON PROJECTION PLANE | INDICATE OBSTACLE AND CAUSE USER TO EXCLUDE OBSTACLE | HIGH | FORMULA 2a | • PRESENT UI TO EXCLUDE OBSTACLE |
| | | | | LOW | FORMULA 2b | • PRESENT INDUCING WORDING IN DIRECTION OF LINE OF SIGHT OF USER<br>• PRESENT BY AUDIO |
| | | REFLECTION OF PROJECTION PLANE | CAUSE USER TO PREPARE ANOTHER PROJECTION PLANE | HIGH | FORMULA 2a | • PRESENT BY AUDIO |
| | | | | LOW | FORMULA 2b | • PRESENT INDUCING WORDING IN DIRECTION OF LINE OF SIGHT OF USER |
| | | COLOR OF OR TEXT ON PROJECTION PLANE | CAUSE USER TO PREPARE ANOTHER PROJECTION PLANE<br>CAUSE USER TO ERASE TEXT OR THE LIKE ON PROJECTION PLANE | HIGH | FORMULA 2a | • SUPERIMPOSE IMAGE ON COLOR OR TEXT PART |
| | | | | LOW | FORMULA 2b | • PRESENT BY AUDIO |
| | ENVIRONMENTAL ILLUMINANCE | ILLUMINANCE CONTRAST IMAGE ILLUMINANCE/ ENVIRONMENTAL ILLUMINANCE | CAUSE USER TO LOWER AMBIENT LIGHT | HIGH | FORMULA 3a | • PRESENT BY AUDIO |
| | | | | LOW | FORMULA 3b | • PRESENT INDUCING WORDING IN DIRECTION OF LINE OF SIGHT OF USER |

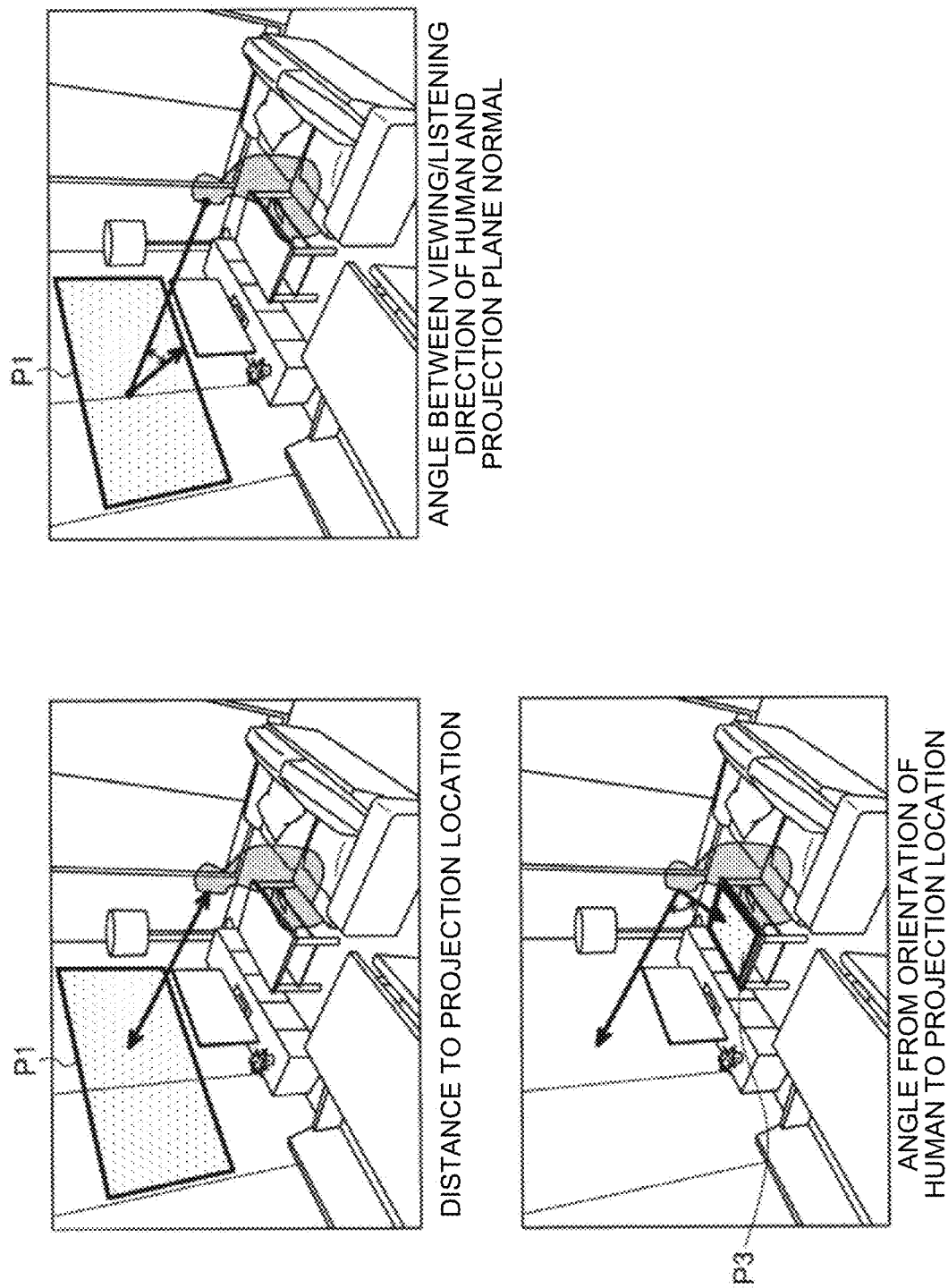

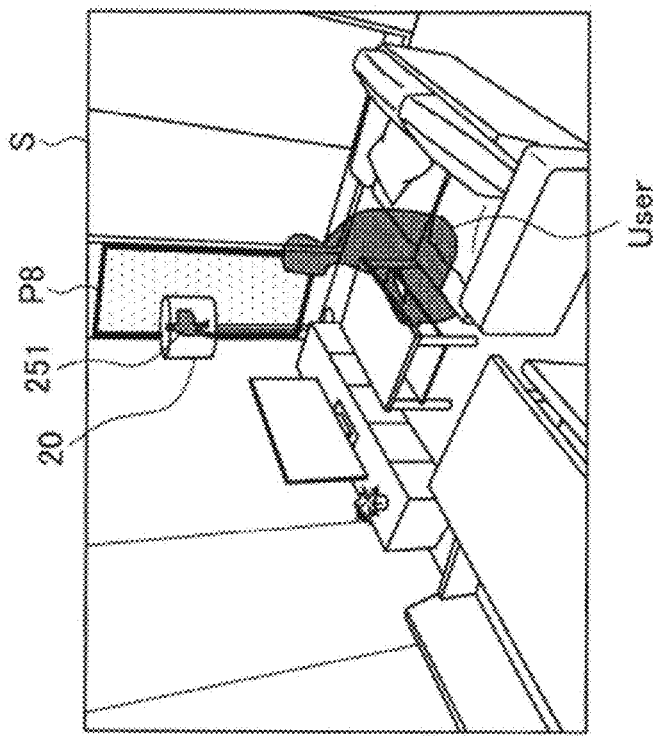
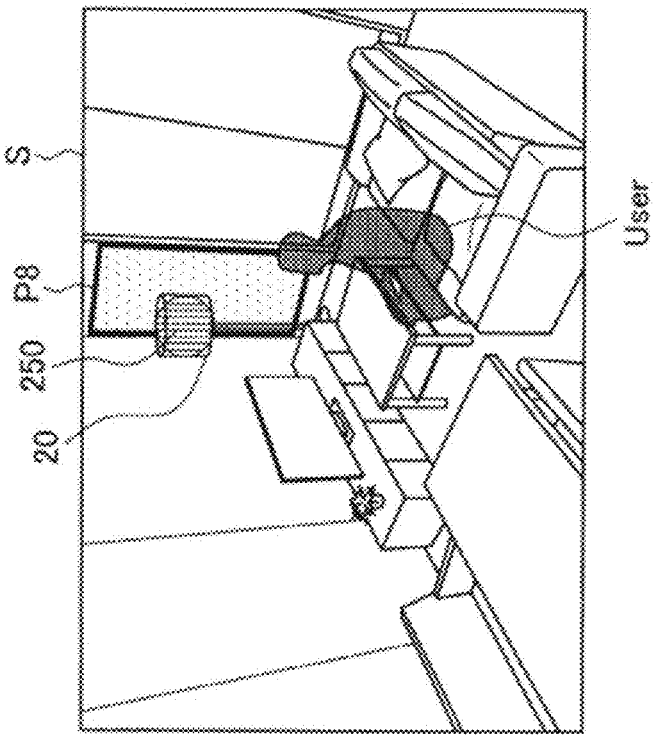
FIG.14

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/020035 filed on May 24, 2018, which claims priority benefit of Japanese Patent Application No. JP 2017-157746 filed in the Japan Patent Office on Aug. 18, 2017. Each of the above-referenced applications is hereby incorporated herein by reference in its entirety.

FIELD

The present disclosure relates to an information processing device, an information processing method, and a program.

BACKGROUND

In recent years, projectors have been miniaturized and are installed and used in conference rooms, private rooms, or the like in many cases. Further, related researches on projectors in recent years propose an interactive utilization method by which a user operates a UI projected by a projector. For example, it is possible to project an image on every location seen in daily life, such as a desk, a table, a wall, a sofa, and a human body (an arm, a palm, and the like) and use the location as a touch panel interactively.

When such a projector is induced, it is indispensable to secure and optimize a projection area, and conventionally, a user has to manually adjust the projection area.

Further, with respect to the adjustment of the projection area, for example, Patent Literature 1 described below discloses a projection-type display device that automatically determines a projectable area. The projection-type display device can detect an obstacle or the like by using an area sensor such as a depth sensor and determine the projectable area.

Further, Patent Literature 2 described below discloses a projector that detects an obstacle in a projection area and presents, to a user, a target as an object to be excluded to secure a wider projection area and a projectable area after the exclusion.

CITATION LIST

Patent Literature

Patent Literature 1: JP 2015-145894 A
Patent Literature 2: JP 2014-95891 A

SUMMARY

Technical Problem

Here, although all of the above-described prior patent literatures relate to a size of a projectable area, visibility of a projection environment in a case where an image is projected by a projector is affected not only by the size of the projection area.

For example, although the visibility of a projection environment may be affected by an environmental factor or a human factor, it has not been sufficiently promoted to prompt a user to take an action to improve the projection environment according to an environment in space.

Therefore, the present disclosure proposes an information processing device, an information processing method, and a program that can prompt a user to take an action to improve a projection environment.

Solution to Problem

According to the present disclosure, an information processing device is provided that includes: a recognition unit that recognizes a projection environment in space on the basis of sensor data obtained by sensing the space in which content is projected; and an inducement control unit that presents, to a user, inducement information to change a state of the projection environment from the recognized first projection environment state to a second projection environment state with improved visibility.

According to the present disclosure, an information processing method is provided that includes, by a processor: recognizing a projection environment in space on the basis of sensor data obtained by sensing the space in which content is projected; and presenting, to a user, inducement information to change a state of the projection environment from the recognized first projection environment state to a second projection environment state with improved visibility.

Moreover, according to the present disclosure, a program is provided that causes a computer to function as: a recognition unit that recognizes a projection environment in space on the basis of sensor data obtained by sensing the space in which content is projected, and an inducement control unit that presents, to a user, inducement information to change a state of the projection environment from the recognized first projection environment state to a second projection environment state with improved visibility.

Advantageous Effects of Invention

As described above, according to the present disclosure, it is possible to prompt the user to take an action to improve the projection environment.

Note that the above-described effect is not necessarily limitative. With or in place of the above effect, there may be achieved any one of the effects described in this specification or other effects that may be grasped from this specification.

BRIEF DESCRIPTION OF DRAWINGS

FIG. 5 is a flowchart illustrating projection control processing according to the present embodiment.

FIG. 6 is a diagram illustrating an example of priority determination and a notification means of inducement content associated with each factor based on the human state recognition according to the present embodiment.

FIG. 7 is a diagram illustrating an example of the priority determination and the notification means of inducement content associated with each factor based on environment recognition according to the present embodiment.

FIG. 8 is a diagram describing evaluation axes related to a human and a projection plane according to the present embodiment.

FIG. 14 is a diagram describing a means of inducing the user action by displaying a projection image to exclude a shadowing object according to the present embodiment.

DESCRIPTION OF EMBODIMENTS

Hereinafter, a preferred embodiment of the present disclosure will be described in detail with reference to the appended drawings. Note that, in this specification and the drawings, components having substantially the same functional configuration are provided with the same reference signs, so that repeated description of these components is omitted.

Further, the description will be made in the following order.

Figure 1:
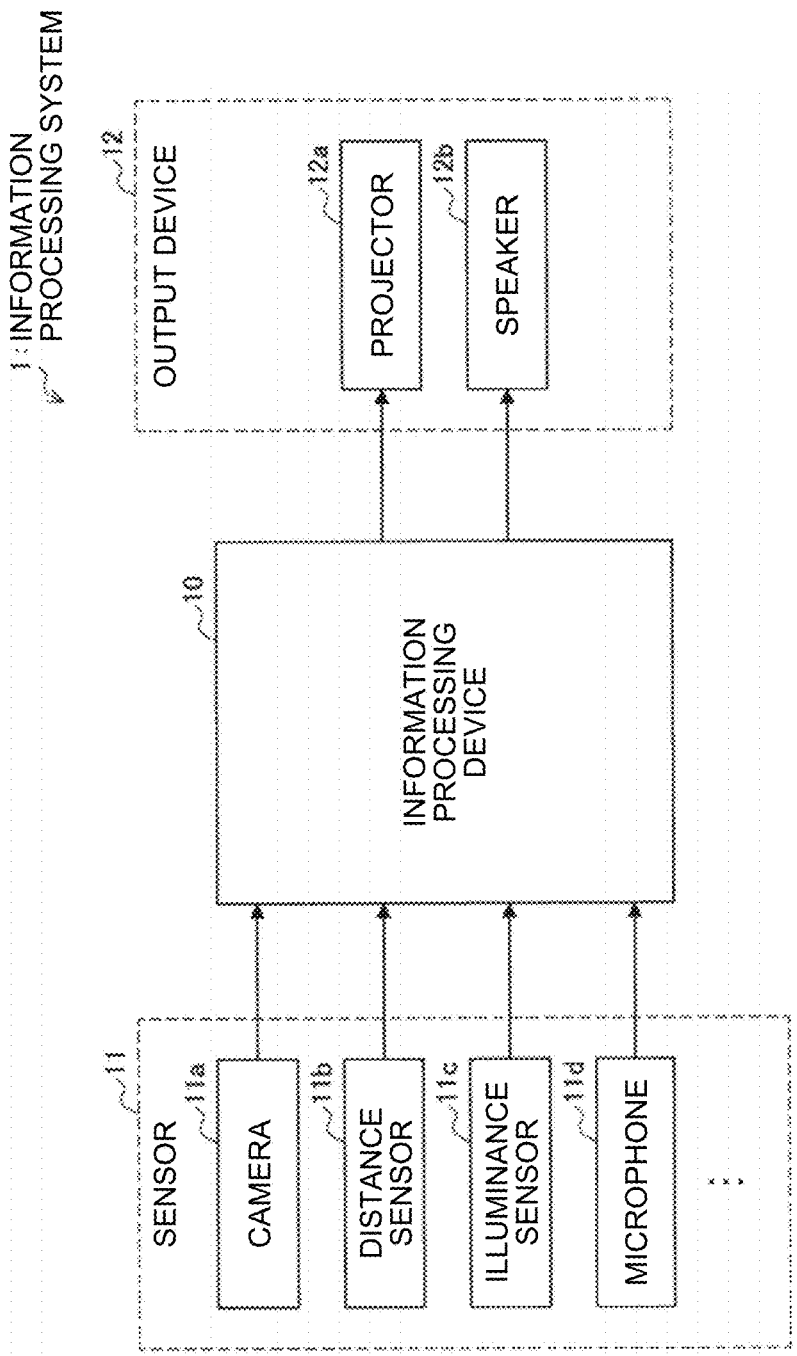
FIG. 1 is a diagram describing an overview of an information processing system according to an embodiment of the present disclosure.

1. Overview of information processing system according to one embodiment of present disclosure
2. Configuration of information processing device 10
3. Operation processing
3-1. Overall flow
(3-1-1. Inducement content decision processing)
(Calculation of evaluation value)
(Decision of priority)
(Specific examples of notification means)
3-2. Notification means decision processing
(3-2-1. Notification means decision processing according to user state)
(3-2-2. Notification means decision processing according to environmental sound)
4. Application examples
5. Conclusion 1. Overview of Information Processing System According to One Embodiment of Present Disclosure FIG. 1 is a diagram describing an overview of an information processing system according to an embodiment of the present disclosure. As illustrated in FIG. 1, the information processing system 1 according to the present embodiment includes an information processing device 10, a sensor 11, and an output device 12. Hereinafter, each device included in the information processing system 1 according to the present embodiment will be described.

(Sensor 11)

The sensor 11 detects surrounding environmental information and outputs the surrounding environmental information to the information processing device 10. Specifically, the sensor 11 performs sensing of information related to a human state such as a position, posture, a direction of a line of sight, face orientation, or finger gesture of the user, and sensing of three-dimensional information in space including a projection plane, an obstacle, and a shadowing object, information of the projection plane such as roughness, material, or color of the projection plane, and information related to an environment in space, such as illuminance environment and volume. The sensor 11 may be single or plural. Further, the sensor 11 may be included in the output device 12.

As illustrated in FIG. 1, the sensor 11 according to the present embodiment is realized by, for example, a camera 11a, a distance sensor 11b, an illuminance sensor 11c, and a microphone 11d, and acquires human-related information and environment-related information in the space. Each sensor 11 may be installed on a side of an object such as a ceiling, a wall, or a table indoors, or may be worn by the user.

The camera 11a captures an image of one or more users in the space or a projection area and acquires a captured image. The camera 11a may be single or plural. Further, an imaging wavelength is not limited to a wavelength in a visible light region, but may include ultraviolet and infrared, or may be limited to a specific wavelength region. Further, the camera 11a may be a sensor that measures only illuminance.

The distance sensor 11b may be realized by a depth sensor that can acquire a three-dimensional image enabling comprehensive recognition of the three-dimensional information in the space and can be driven by a mechanical mechanism. Further, examples of methods adopted by the distance sensor 11b include a method using infrared light as a light source, a method using an ultrasonic wave, a method using a plurality of cameras, and a method using image processing. Further, the distance sensor 11b may be single or plural, and may acquire distance information in an area at once.

The illuminance sensor 11c acquires illuminance at each location in the space. The illuminance sensor 11c may be single or plural.

The microphone 11d collects surrounding audio (including an environmental sound) and acquires audio data.

Note that, the camera 11a, the distance sensor 11b, the illuminance sensor 11c, and the microphone 11d that realize the sensor 11 may be provided in different locations or in the same location.

(Information Processing Device 10)

The information processing device 10 analyzes information acquired from the sensor 11 and recognizes an environment of a projection area where projection is performed by the projector 12a and a user state. Then, the information processing device 10 decides an action that the user is prompted to take to obtain an optimal projection environment, and notifies the user via the projector 12a or a speaker 12b. As described above, visibility of the projection environment in a case where an image is projected by the projector 12a is affected not only by a size of the projection area, but also by an environmental factor such as dots per inch (DPI) after the projection, color or an optical reflection characteristic of the projection plane, or illuminance of the projection environment, and a human factor such as a position, posture, or a direction of a line of sight of the user against the projection location, and the number of the users. Therefore, in the present embodiment, an ideal projection environment is constructed so that it is easy to view and listen content and to operate a projected UI by prompting the user to take a predetermined action to improve the visibility of the projection environment when an image is projected.

A specific configuration of the information processing device 10 will be described later with reference to FIG. 2.

(Output Device 12)

The output device 12 is a device of various kinds, which presents information to the user, according to control by the information processing device 10. For example, as illustrated in FIG. 1, the output device 12 is realized by the projector 12a (projection display device) and the speaker 12b (audio output device). Note that the specific example of the output device 12 is not limited to the one illustrated in FIG. 1, and any other devices, for example, a display device having a display unit, a lighting device, a vibration device, a wind output device, an air conditioning device, and various kinds of actuators, which may present some kind of information to the user may be envisaged. Further, a plurality of output devices 12 may exist in the space. Further, the output device 12 may be realized by a wearable device (a head mounted display (HMD), smart eyeglasses, a smart watch, a smart band, a smart neck, a neck speaker, an earring type speaker, an ear-cuff type speaker, or the like) owned by the user.

Further, the projector 12a and the speaker 12b may be fixed in the space, or may be output to any arbitrary location in the space. In the present embodiment, notification that prompts the user to take an action to improve the projection environment is performed via the projector 12a and the speaker 12b. For example, the projector 12a is realized by a drive-type projector that can control a rotation direction with two shafts. Further, as a method for displaying information at an arbitrary location in space, for example, a display (display device) may be arranged around the entire space, or another projector such as an all-around projector or a hologram imaging device may be used. Further, smart eyeglasses or an HMD worn by the user may be used. Further, an image display device (such as a television or a tablet terminal) installed on the object side such as a table or a sofa may be used. Further, the speaker 12b may be a directional speaker. Further, the speaker 12b may be a unit integrated with the projector 12a, may be arranged indoors, or may be provided in a personal terminal such as a smartphone or a mobile phone.

The configuration of the information processing system 1 according to the present embodiment has been described above. Each device of the information processing system 1 may be installed at different locations or at the same location.

Further, each device of the information processing system 1 may be configured as separate bodies, or at least some of the devices may be configured as the same body. For example, the information processing device 10 may be configured to be integrated with the sensor 11 or the output device 12.

2. Configuration of Information Processing Device 10

Figure 2:
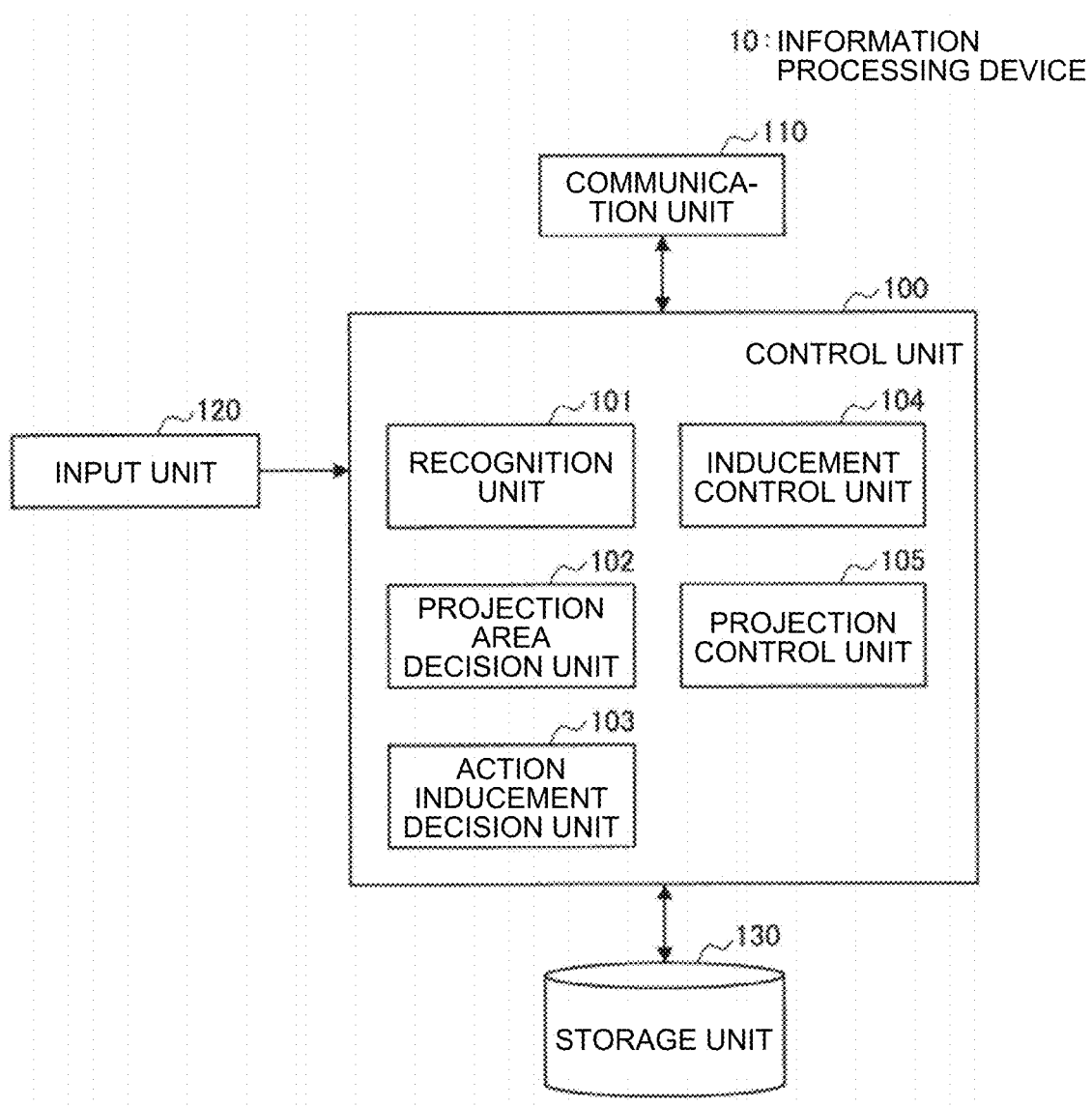
FIG. 2 is a block diagram illustrating an example of a configuration of an information processing device according to the present embodiment.

FIG. 2 is a block diagram illustrating an example of a configuration of the information processing device 10 according to the present embodiment. As illustrated in FIG. 2, the information processing device 10 includes a control unit 100, a communication unit 110, an input unit 120, and a storage unit 130.

The control unit 100 functions as an arithmetic processing device and a control device, and controls overall operation in the information processing device 10 according to various kinds of programs. The control unit 100 is realized by an electronic circuit such as a central processing unit (CPU) or a microprocessor, for example. Further, the control unit 100 may include a read only memory (ROM) that stores a program, a calculation parameter, or the like to use, and may include a random access memory (RAM) that temporarily stores a parameter or the like which changes as appropriate.

Further, the control unit 100 according to the present embodiment also functions as a recognition unit 101, a projection area decision unit 102, an action inducement decision unit 103, an inducement control unit 104, and a projection control unit 105.

The recognition unit 101 recognizes an environment of the projection location and the user state on the basis of various kinds of sensor data transmitted from the sensor 11. For example, in environment recognition processing, a "projection plane", a "shadowing object", an "obstacle", an "environmental illuminance", an "environmental sound (noise)", or the like is recognized.

Figure 3:
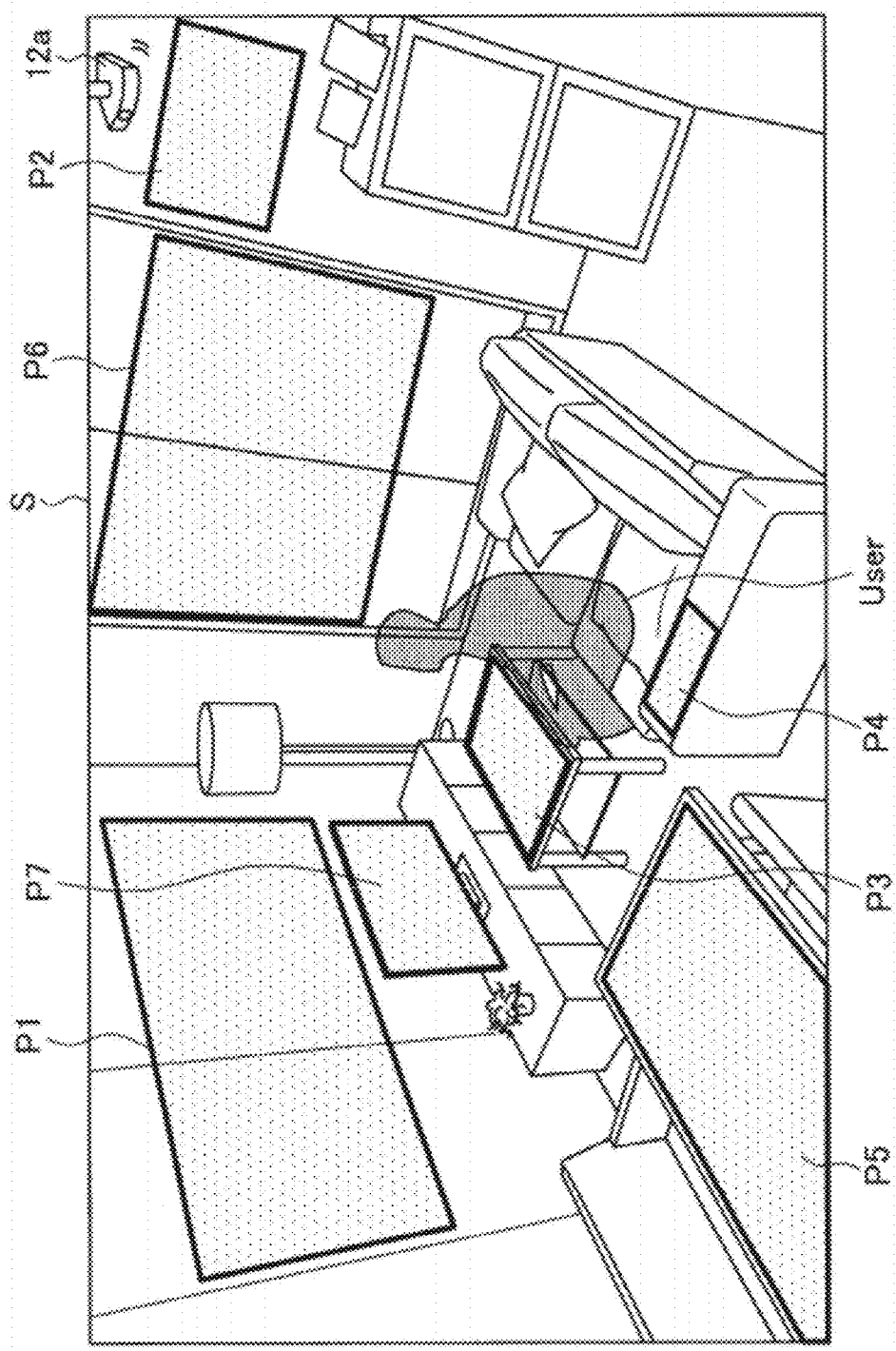
FIG. 3 is a diagram illustrating an example of detecting a plane area in space according to the present embodiment.

With respect to the "projection plane", the recognition unit 101 recognizes a three-dimensional shape (spatial recognition) indoors on the basis of depth data acquired from the distance sensor 11b (depth sensor), and calculates, from a recognition result, several plane areas as projection areas that are candidates for the projection plane. Here, FIG. 3 illustrates an example of detecting a plane area in the space. As illustrated in FIG. 3, in space S, several projection planes P1 to P7 are calculated on the basis of depth data of a wall, top of a table, an armrest of a sofa, or the like. Note that, on recognition of the "projection plane", the recognition unit 101 can also recognize reflectance of the projection plane or a texture (color, a character, or the like) on a plane surface, on the basis of a color image acquired by the camera 11a.

With respect to the "shadowing object", the recognition unit 101 calculates the "projection plane" as described above, and then recognizes an object arranged in front of the projection plane by using the depth sensor (object recognition). For example, a case where another user is standing near a location where the projection is desired, or a case where a projectable area has been reduced due to furniture being arranged, is assumed. Because a size of the shadowing object affects an area that can be projected by the projector 12a, priority of an inducement action is decided by the size of the shadowing object on decision of content of action inducement, which will be described later.

With respect to the "obstacle", the recognition unit 101 recognizes, by using the depth sensor, an object arranged on a plane surface. For example, a cup or a remote controller placed on a table is assumed.

With respect to the "environmental illuminance", the recognition unit 101 measures illuminance around the projection location on the basis of illuminance data acquired by the illuminance sensor 11c. It is possible to calculate an index for visibility of an image by comparing illuminance of the projection plane with projected illuminance of the projector 12a.

Figure 4:
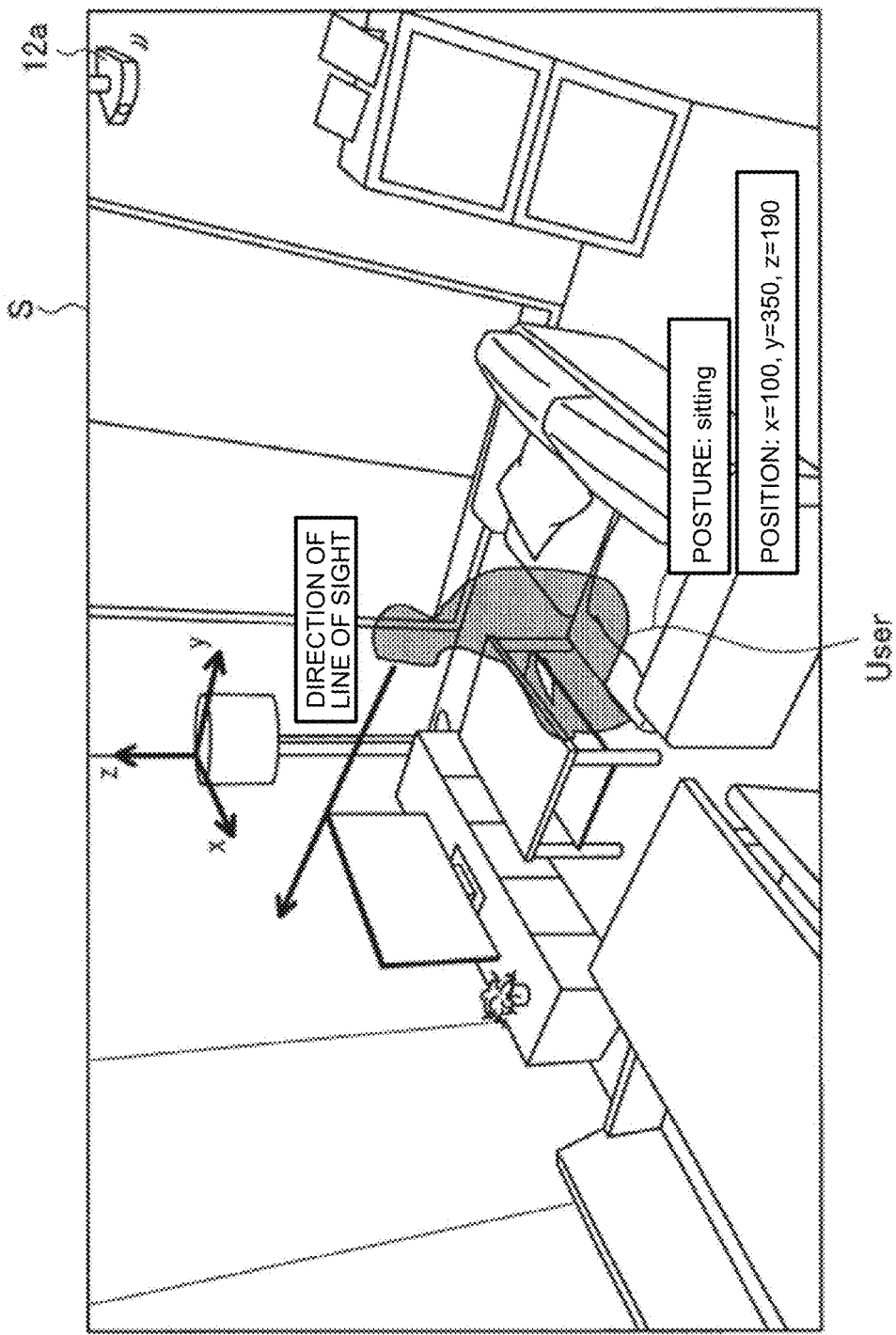
FIG. 4 is a diagram illustrating an example of human state recognition according to the present embodiment.

Further, in human state recognition processing, the recognition unit 101 detects the position, the posture, the direction of the line of sight, and the like of the user existing in the space, on the basis of the depth data or a captured color image. Here, FIG. 4 illustrates an example of human state recognition. As illustrated in FIG. 4, for example, the direction of the line of sight (view vector) or the position of the user may be acquired by using a three-dimensional coordinate position (x, y, z). Further, a user state such as "standing", "sitting", or "laying down" is recognized as the posture.

The projection area decision unit 102 decides an appropriate projection location from the candidates for the projection plane (plane areas) recognized by the recognition unit 101. For example, the projection area decision unit 102 decides the appropriate projection location, on the basis of projection plane information (a projection size or a DPI value), human information (a position, posture, or a direction of a line of sight), and content information (a content size, metadata (a movie, an image, a website, text, a GUI, or the like)) to be projected. More specifically, for example, the projection area decision unit 102 causes the user to input to a graphical user interface (GUI), and, in a case where display on a wide screen is desired, decides the projection plane P3 (a dining table), which is wide and close to the user, as the projection location, among the projection planes P1 to P7 illustrated in FIG. 3.

The action inducement decision unit 103 decides content of action inducement to the user for improvement of the projection environment (viewing and listening, or an operation environment) at the projection location decided by the projection area decision unit 102. In other words, in the present embodiment, it is possible to present, to the user, inducement information to change a state of the projection environment from a first projection environment state recognized by the recognition unit 101 to a second projection environment state with improved visibility.

Details of action inducement decision processing will be described later with reference to FIG. 6 and FIG. 7. For example, the action inducement decision unit 103 calculates an evaluation value for each factor on the basis of a recognized environment or human state, and decides priority of each inducement content on the basis of the calculated evaluation value. Examples of the "factor" include a viewing/listening distance of the user, an angular difference of a projection plane, the shadowing object to the projection plane, the obstacle on the projection plane, reflection of the projection plane, color of or a character on the projection plane, a diagram, and environmental illuminance.

The inducement control unit 104 performs control such that a notification (notification) that prompts the user to take an action to improve the projection environment. The notification of the action inducement may be displayed with a message or presented by audio. Further, in a case where there is a plurality of inducement actions, contents of the inducement actions may be notified to the user sequentially. Further, in a case where priority of an inducement action is high, the inducement control unit 104 may explicitly present inducement content so that the user can easily see and recognize the inducement content, and in a case where the priority of the inducement action is low, the inducement control unit 104 may present the inducement content merely by audio or by wording presented in the direction of the line of sight.

The projection control unit 105 performs control such that predetermined content (an image or the like) is projected on the decided projection location. The projection control unit 105 may perform projection after all notifications by the inducement control unit 104 are completed. Further, on the projection, the projection control unit 105 may perform projection by recalculating geometric correction, color correction, or a projection area of the image. This is to perform projection in accordance with a current environment in real time, because there may be a case where the environment has changed due to the notification of the action inducement.

(Communication Unit 110)

The communication unit 110 transmits/receives data by wire or wirelessly to/from an external device directly or via a network. For example, the communication unit 110 is communicatively connected to the sensor 11 and the output device 12 by using a wired/wireless local area network (LAN), Wi-Fi (registered trademark), Bluetooth (registered trademark), short-range wireless communication, or the like.

(Input Unit 120)

The input unit 120 receives input information to the information processing device 10. For example, the input unit 120 may be an operation input unit that receives an operation instruction from the user. The operation input unit may be a touch sensor, a pressure sensor, or a proximity sensor. Alternatively, the operation input unit may be a physical configuration such as a button, a switch, or a lever. Further, the input unit 120 may be an audio input unit (microphone).

(Storage Unit 140)

A storage unit 140 is realized by a read only memory (ROM) that stores the program, the calculation parameter, or the like to be used for processing by the control unit 100, and a random access memory (RAM) that temporarily stores the parameter or the like which changes as appropriate.

In the storage unit 140, for example, content (an image or the like) is stored. Note that the content may be transmitted from the external device via the communication unit 110.

The configuration of the information processing device 10 according to the present embodiment has been specifically described above. Note that the configuration of the information processing device 10 according to the present embodiment is not limited to the example illustrated in FIG. 2, and may further include an output unit, for example. The output unit may be realized by, for example, a display unit or an audio output unit (microphone). The display unit may output an operation screen, a menu screen, or the like, and may be a display device, for example, a liquid crystal display (LCD) or an organic electro luminescence (EL) display.

Further, the information processing device 10 may include a plurality of devices. Further, the information processing device 10 may be realized by a client device (a smartphone, a tablet terminal, a personal computer (PC), or the like), or may be realized by a server on a network.

3. Operation Processing

Next, operation processing of the information processing system according to the present embodiment will be specifically described with reference to the drawings.

<3-1. Overall Flow>

First, projection control processing according to the present embodiment will be described with reference to FIG. 5. FIG. 5 is a flowchart illustrating projection control processing according to the present embodiment.

As illustrated in FIG. 5, first, the recognition unit 101 of the information processing device 10 performs the human state recognition in the space (Step S103) and environment recognition (Step S106), on the basis of various sensor data (a captured image, depth data, illuminance information, audio data, or the like) acquired from the sensor 11.

Next, the projection area decision unit 102 decides a location of the projection area where the projector 12a projects content (Step S109). Specifically, from one or more plane areas in the space, which are extracted in the environment recognition, the projection area decision unit 102 decides an appropriate projection location, on the basis of the projection plane information (the projection size or the DPI value), the human state information (the position, the posture, or the direction of the line of sight), the content information (the content size, the metadata (the movie, the image, the website, the text, or the GUI)), or the like to be projected.

Next, the action inducement decision unit 103 decides content of the action inducement to induce the user (Step S112). Although details will be described later, for example, the action inducement decision unit 103 calculates an evaluation value of each factor based on the human state recognition result and the environment recognition result, and decides priority whether or not each action inducement should be performed, on the basis of the evaluation value.

Next, the inducement control unit 104 decides a notification means of performing notification (notification) that prompts the user to take an action to improve the projection environment (Step S115), and performs the notification by the decided means (Step S118). Although details of determination processing of the notification means will be described later, the inducement control unit 104 may decide the notification means according to, for example, the priority of each action inducement based on the evaluation value for each factor of a human or an environment decided in the above-described Step S112.

Next, after performing the notification to the user, the recognition unit 101 again performs human state recognition (Step S121) and environment recognition (Step S124).

Next, in a case where the projection environment has not changed (it is estimated that the user has not executed the notification content) (Step S127/No), the fact is fed back to the user (Step S130). Specifically, it may be notified that the environment has not changed, or the action inducement may be notified again.

Next, in a case where there is another content to be induced (Step S133/Yes), the processing returns to the above-described Step S115 to notify the user of the next inducement content.

Next, in a case where all the notifications are ended (Step S133/No), the control unit 100 decides the projection area again by the projection area decision unit 102 (Step S136), and controls the image projection by the projection control unit 105 (Step S139). Since it is also assumed that the environment has changed, the control unit 100 calculates and decides the projection area again on the basis of real-time sensor data by the projection area decision unit 102. Further, the projection control unit 105 may perform geometric correction or color correction on the image to be projected as necessary on the basis of the sensor data.

The projection control processing according to the present embodiment has been described above. Next, the "inducement content decision processing" in the above-described Step S112 will be described in detail.

(3-1-1. Inducement Content Decision Processing)

The action inducement decision unit 103 according to the present embodiment calculates an evaluation value of each factor from the human state recognition and the environment recognition, and, on the basis of the evaluation value, decides the priority whether or not each inducement action should be performed. Here, FIG. 6 and FIG. 7 illustrate examples of inducement content for each factor, and priority determination and notification means of the inducement content. FIG. 6 illustrates an example of priority determination and notification means of the inducement content associated with each factor based on the human state recognition. Further, FIG. 7 illustrates an example of priority determination and notification means of the inducement content associated with each factor based on the environment recognition.

(Calculation of Evaluation Value)

The action inducement decision unit 103 calculates an evaluation value for each factor as illustrated in FIG. 6 and FIG. 7. First, as illustrated in FIG. 6, in a large category "human information", "viewing/listening distance (Dist)", "angle between viewing/listening direction of human and projection plane normal (Watch Angle)", and "angle from orientation of human to projection location (Screen Angle)" are calculated as evaluation values of the factors, on the basis of a result of the human recognition processing such as the position, the posture, and the direction of the line of sight of the human with respect to the projection plane. Here, explanatory diagrams of evaluation axes with respect to the human and the projection plane are illustrated in FIG. 8. In FIG. 8, there are illustrated an explanatory diagram of, as an example, a distance between the projection plane P1 and the user (viewing/listening distance) in an upper left part of FIG. 8, an explanatory diagram of an angle between a viewing/listening direction of the user on the projection plane P1 and the projection plane normal (a direction of a line of sight) in an upper right part of FIG. 8, and an explanatory diagram of an angle from orientation of the human to the projection location (for example, the projection plane P3) in a lower part of FIG. 8.

Next, as illustrated in FIG. 7, a large category "environmental information" is divided into information about the projection plane and information about the environmental illuminance. For the information about the projection plane, "an amount of reduction in a projection area by a shadowing object (Occlusion)", "an amount of reduction in a projection area by an obstacle (Obstacle)", "reflectance of projector light on a projection plane (Reflectance), and "an amount of reduction in a projection area by a texture (color or a character) on a projection plane (Letter Color)" are calculated as evaluation values of the factors, with respect to the shadowing object, the obstacle, the reflectance of the projection plane, and the color of or the character on the projection plane, which are recognized on the basis of the sensor data.

For "an amount of reduction in a projection area by a shadowing object", since the projection area is reduced, for example, in a case where a shadowing object such as a stand light is arranged in front of the projection plane detected on a wall surface, the reduction is calculated as the evaluation value. Further, for "an amount of reduction in a projection area by an obstacle", since the projection area is reduced, for example, in a case where an obstacle such as a cup or a remote controller is placed on a table, the reduction is calculated as the evaluation value. Further, for "reflectance of projector light on a projection plane", since the reflectance of the projector light differs due to material of the projection plane, the difference is calculated as the evaluation value. Further, for "an amount of reduction in a projection area by a texture on a projection plane", in a case where the projection plane is a whiteboard or a bulletin board, since the projection area is reduced because a portion where a character, an illustration, or the like is drawn is an inappropriate projection area, the reduction is calculated as the evaluation value.

Further, for the information related to the environmental illuminance, the evaluation value is calculated by setting, as the environmental illuminance (Environmental Light), a ratio of the projected illuminance of the projector on the projection plane to the environmental illuminance around the projection plane. The evaluation value of the environmental illuminance is defined as follows:

Environmental Light=(projected illuminance of projector)/(environmental illuminance of projection plane)

(Decision of Priority)

Next, decision of the priority of the inducement content of each factor by the action inducement decision unit 103 will be described. For example, as illustrated in FIG. 6, "viewing/listening distance" is associated with inducement content 'cause user to move to optimal viewing/listening position with respect to projection position', and "angle of projection plane" is associated with inducement content 'guide user to position in perpendicular direction from projection plane'. The action inducement decision unit 103 decides the priority of each inducement content as described above on the basis of the evaluation value of the factor. For example, the following two types of determination formulas may be applied to the priority determination. Note that a factor other than the factors exemplified in FIG. 6 and FIG. 7 can be added by being applied to the following determination formulas.

If thresholds exist at both ends

In a case of an evaluation value having thresholds at both ends, the priority is decided by the following Formula 1a and Formula 1b. In the following formulas, "value" is an evaluation value of a factor, and Priority High_Threshold Low and Priority High_Threshold High are thresholds for determining the priority to be "high". Further, Priority Low_Threshold Low and Priority Low_Threshold High are thresholds for determining the priority to be "low". If the following Formula 1a holds, the priority is "high", and if the following Formula 1b holds, the priority is "low". Note that, in a case where both the following Formula 1a and the following Formula 1b hold, the Formula 1a for determination of priority "high" may be applied.

Priority High_Threshold Low<value

Or value<Priority High_Threshold High                    Formula 1a

Priority Low_Threshold Low<value

Or value<Priority Low_Threshold High                     Formula 1b

The above-described Determination Formulas 1a and 1b may be applied to the factors of Dist, Watch Angle, Screen Angle, and Reflectance described above. For Dist, both too far and too close viewing/listening distances may not be suitable for viewing or listening. For Watch Angle and Screen Angle, visibility is reduced if the watch angle or the screen angle is too large in both positive and negative directions. Further, for Reflectance, a projection plane made of a material with low reflectance, such as concrete, or, conversely, a metallic material with too high reflectance is not suitable. For the reasons described above, Formula 1a and Formula 1b are applied to the above-described factors.

In case where lower or higher evaluation value is better

In a case where a lower evaluation value is better, the priority is decided by the following Formula 2a and Formula 2b. Further, in a case where a higher evaluation value is better, the priority is decided by the following Formula 3a and Formula 3b. In the following formulas, "value" is an evaluation value of a factor, and Priority High_Threshold and Priority Low_Threshold are thresholds used to determine the priority to be "high" and "low", respectively. Further, in a case where a determination formula holds, the priority is applied. Note that, in a case where both Formula 2a and Formula 2b hold, Formula 2a, which is for determination of priority "high", is applied. Formula 3a and Formula 3b are applied similarly.

Priority High_Threshold<value                         Formula 2a

Priority Low_Threshold<value                          Formula 2b

Priority High_Threshold>value                         Formula 3a

Priority Low_Threshold>value                          Formula 3b

The above-described Determination Formulas 2a, 2b, 3a, and 3b may be applied to the priority decision of evaluation values of Occlusion, Obstacle, Letter Color, and Environmental Light described above. For example, Formula 2a and Formula 2b are applied to Occlusion, Obstacle, and Letter Color, because the lower the evaluation value is, the larger the projection area that can be covered is. Further, Formula 3a and Formula 3b are applied to Environmental Light, because the larger the value is, the more suitable the environmental illuminance is for the projection environment.

Note that, although the inducement content is associated with each factor as illustrated in FIG. 6 and FIG. 7 in the present embodiment, the inducement content may be associated with a combination of a plurality of factors to determine priority. For example, because the viewing/listening distance and the angular difference of the projection plane are factors correlated with each other, priority of associated inducement content may be determined in consideration of two evaluation values.

(Specific Examples of Notification Means)

Next, specific examples of the means of inducement provided in FIG. 6 and FIG. 7 will be described with reference to FIG. 9 to FIG. 22. In the present embodiment, in a case where priority of inducement is high, inducement content may be explicitly presented so that the user can easily see and recognize the inducement content, and in a case where the priority of the inducement is low, the inducement content may be merely presented by audio or notified by wording in the direction of the line of sight of the user.

Figure 9:
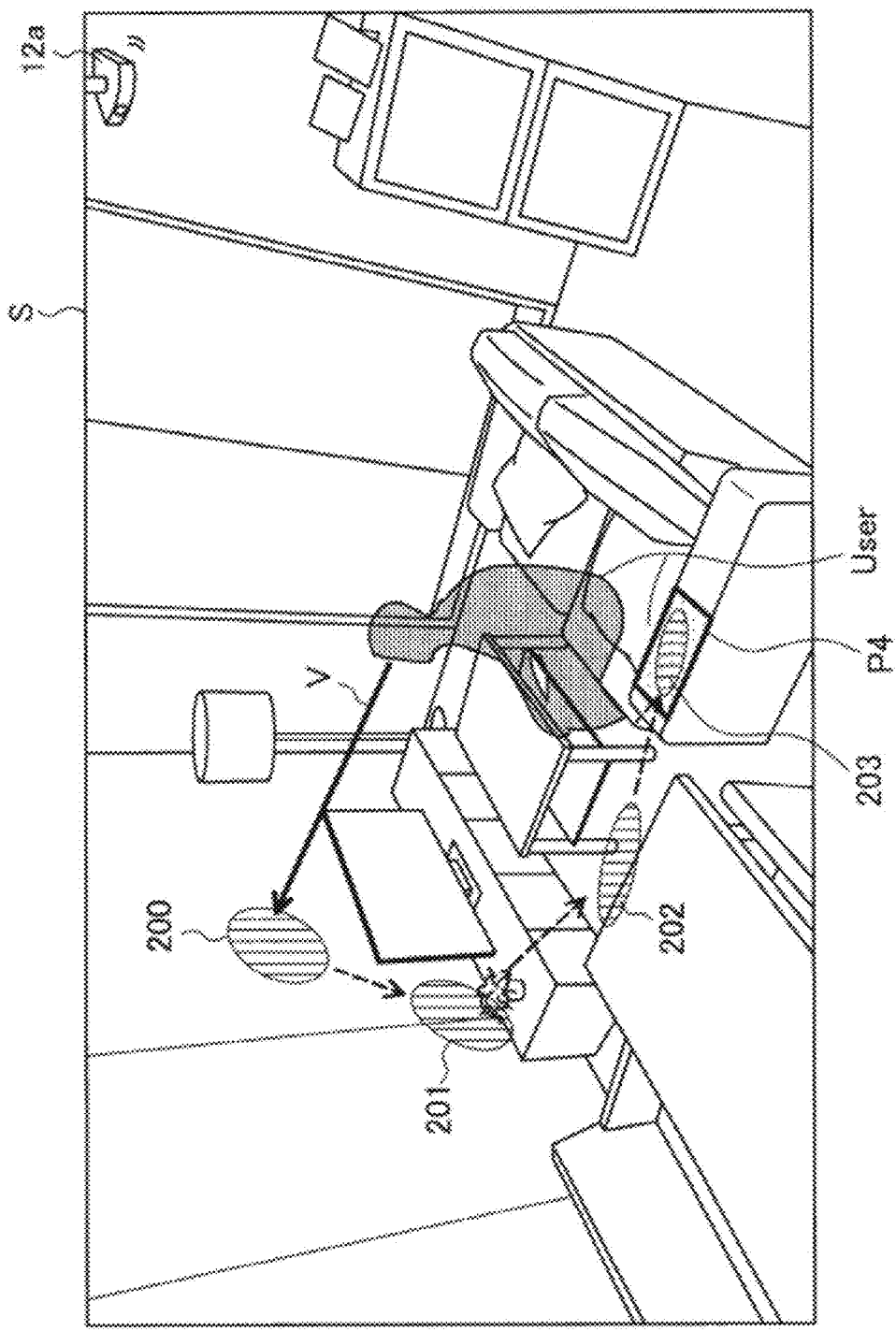
FIG. 9 is a diagram describing a means of inducement by moving a projection image from a direction of a line of sight of a user to a projection location according to the present embodiment.
Figure 10:
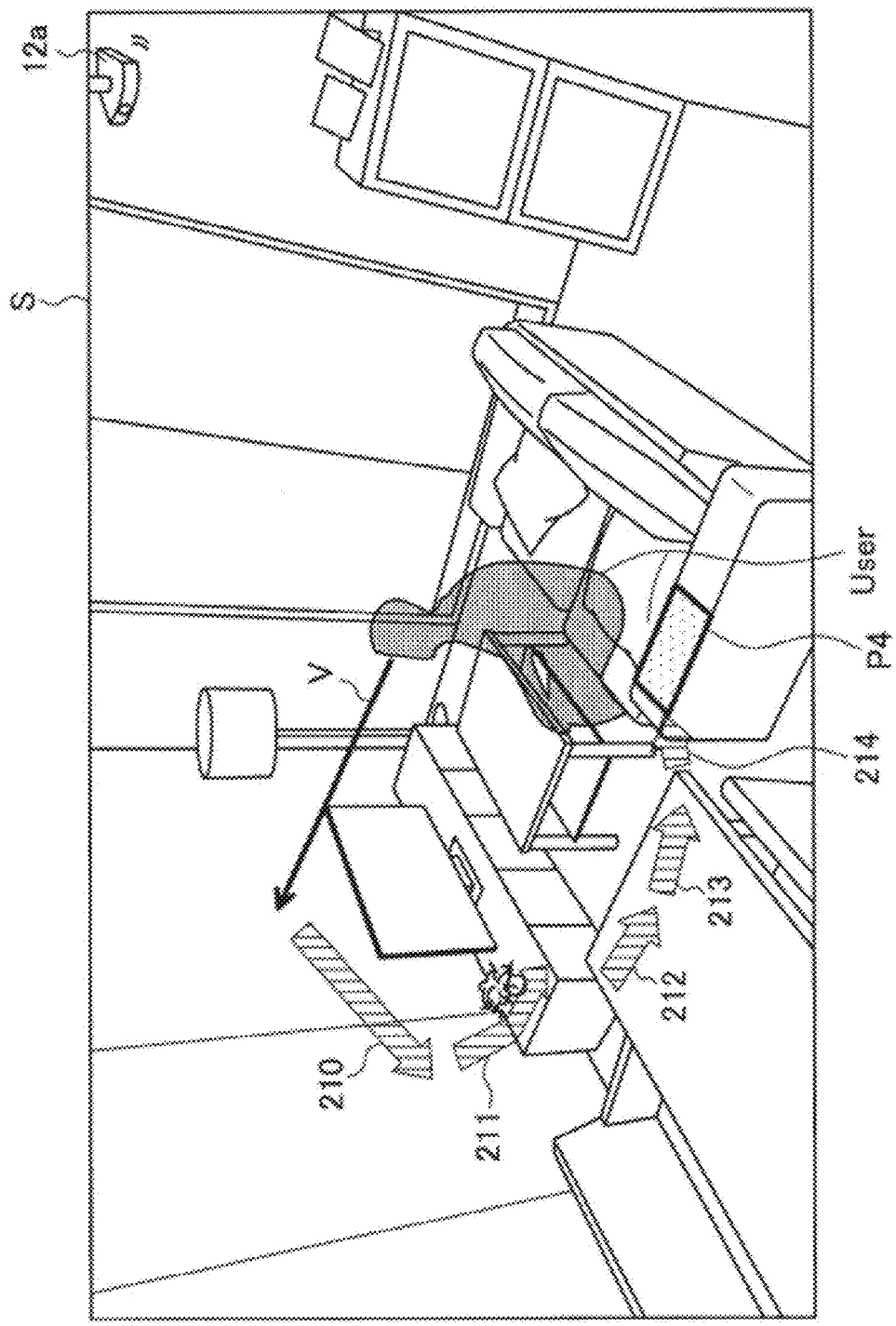
FIG. 10 is a diagram describing a means of inducing a user action by moving a projection image from the direction of the line of sight of the user to the projection location according to the present embodiment.

FIG. 9 and FIG. 10 are diagrams for describing a means of inducing a user action by moving a projection image from the direction of the line of sight of the user to a projection location. For example, as illustrated in FIG. 9, in a case where an image is projected on a location far away from the user's line-of-sight direction V (for example, outside a field of view, the projection plane P4), the information processing device 10 displays a projection image 200 resembling a spotlight in the direction of the line of sight of the user by using the projector 12a, and moves the projection image of the spotlight from there to a projection location (the projection plane P4 of an armrest portion of a sofa) (projection images 201, 202, and 203). Thus, it is possible to explicitly present the projection location to the user, turn the user to the projection location (action inducement) and improve environment associated with human factors. Note that the projection image used for inducement is not limited to the spotlight illustrated in FIG. 9, and may be, for example, arrow images 210 to 214 as illustrated in FIG. 10.

Figure 11:
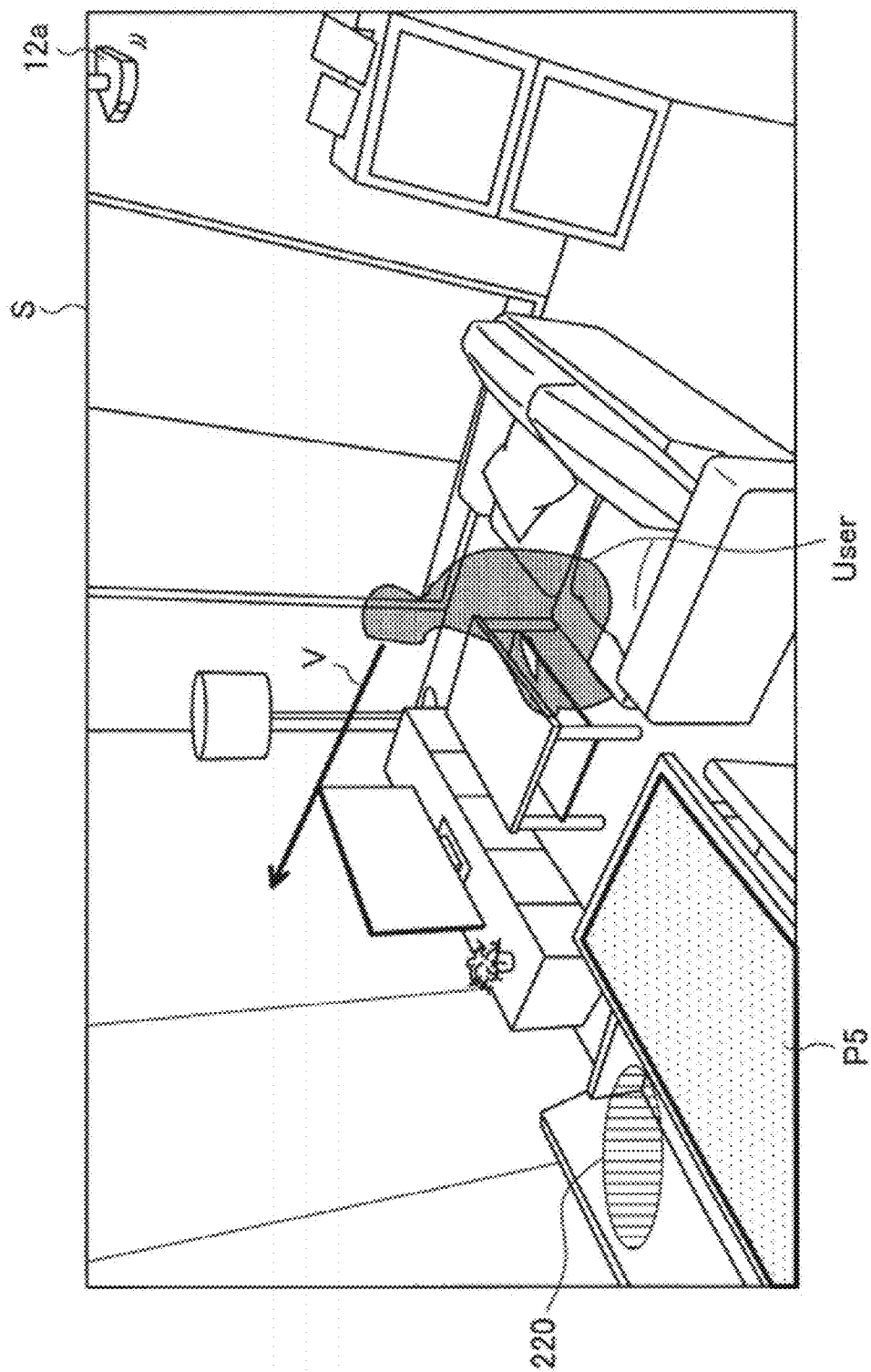
FIG. 11 is a diagram describing a means of inducing the user action by displaying projection images at a projection position and an ideal viewing/listening position according to the present embodiment.
Figure 12:
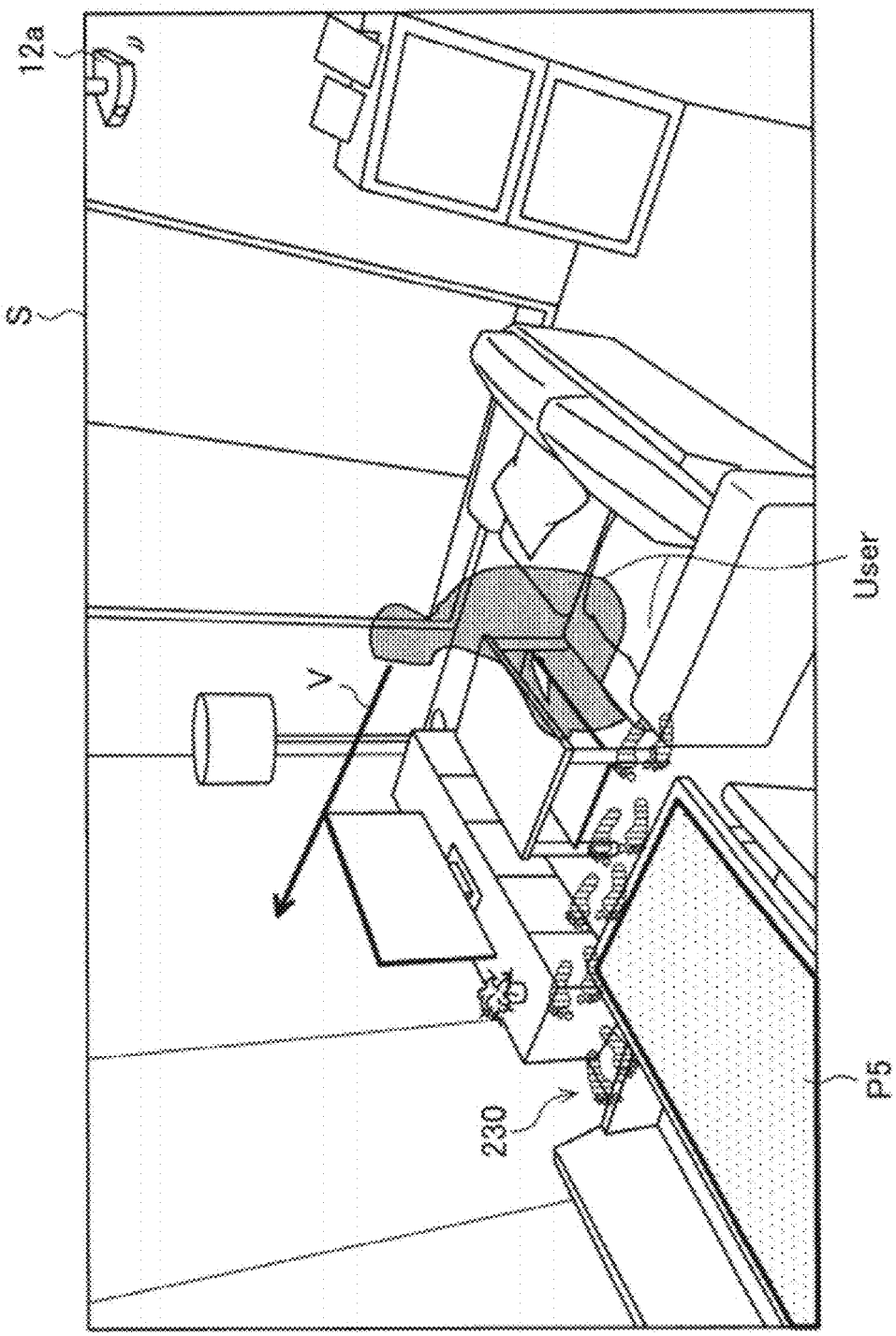
FIG. 12 is a diagram describing a means of inducing the user action by projecting footprint images to an ideal viewing/listening position according to the present embodiment.
Figure 13:
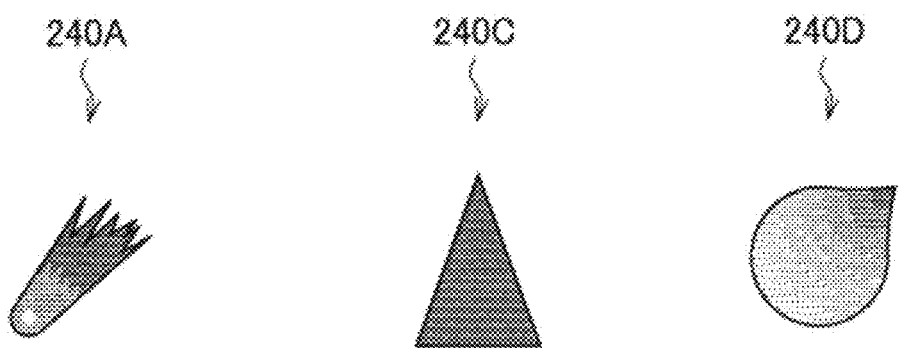
FIG. 13 is a diagram illustrating other examples of images to be projected for the inducement of the action according to the present embodiment.

FIG. 11 is a diagram describing a means of inducing a user action by displaying projection images at a projection position and an ideal viewing/listening position. In the example illustrated in FIG. 11, for example, in a case where the projection location is a top of a table that is out of the user's line-of-sight direction V (projection plane P5), a projection image 220 resembling a spotlight is displayed on the table or on a chair that is an ideal viewing/listening position near the table. Further, as illustrated in FIG. 9 and FIG. 10, a projection image resembling a spotlight may be moved from a current direction of the line of sight of the user to an ideal viewing/listening position (here, on the chair near the table). Further, as illustrated in FIG. 12, a projection image 230 resembling footprints may be displayed from a foot of the user to the viewing/listening position.

Thus, it is possible to explicitly present to the user where the projection location is and where to view and listen, to cause the user to move to the viewing/listening position (action inducement) and to improve the environment associated with human factors. Note that the projection images used for the inducement are not limited to the examples illustrated in FIG. 11 and FIG. 12, and may be, for example, projection images 240A to 240C illustrated in FIG. 13. In other words, the projection image may use expression resembling a shooting star having a trail, such as the projection image 240A, expression resembling a triangle, such as the projection image 240B, or expression in which color, brightness, transparency, thickness, or the like is changed in a direction indicated, such as the projection image 240C.

Figure 15:
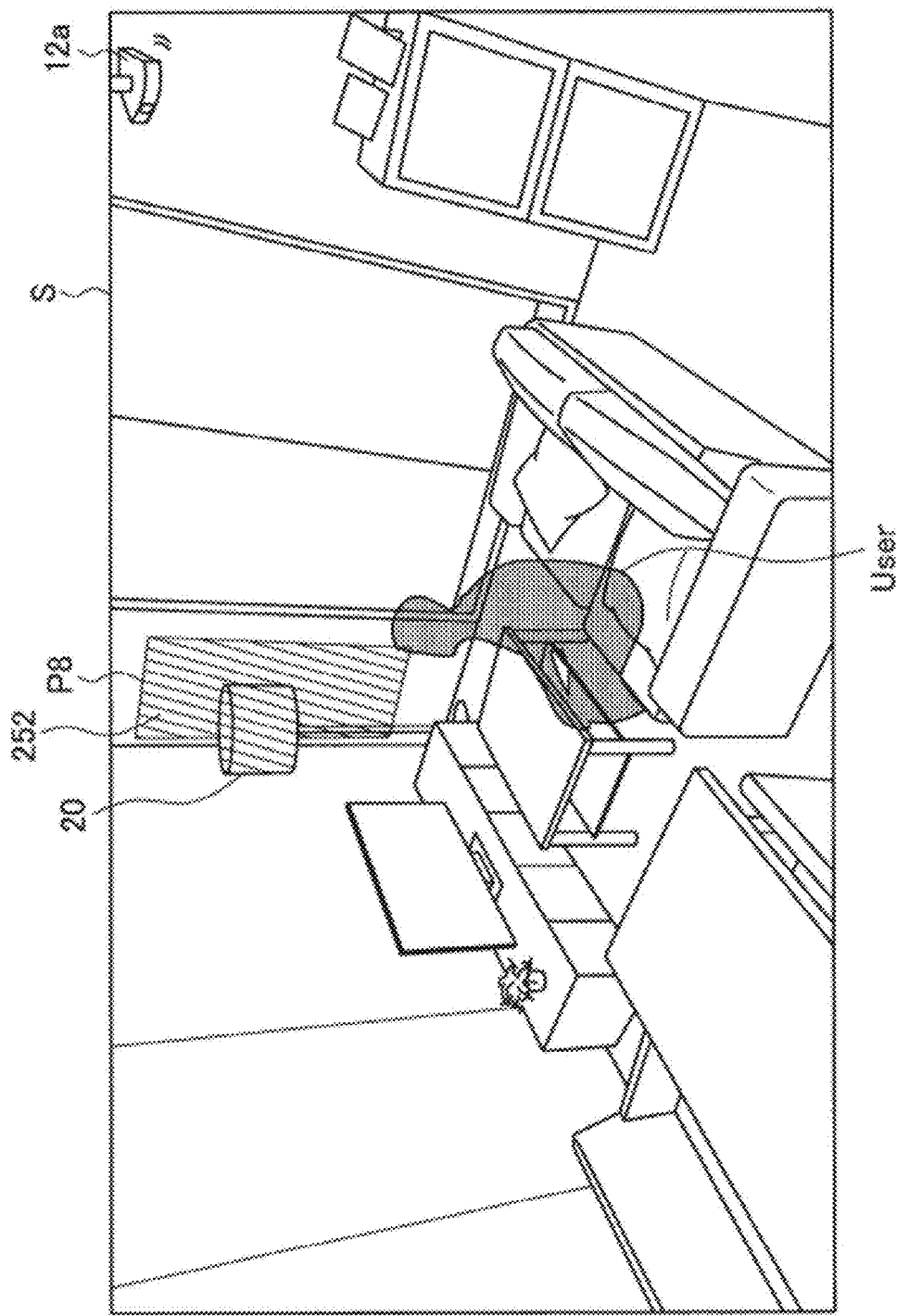
FIG. 15 is a diagram describing a means of inducing the user action by displaying a projection image to exclude the shadowing object according to the present embodiment.

FIG. 14 and FIG. 15 are diagrams for describing means of inducing a user action by displaying a projection image to exclude a shadowing object. For example, in a case where a shadowing object existing in front of the projection plane is recognized, the information processing device 10 displays a projection image that emphasizes to the user, or causes the user to recognize, the shadowing object to be excluded. Specifically, for example, as illustrated on a left side of FIG. 14, a projection image 250 resembling a spotlight is displayed on a shadowing object 20 existing in front of a projection plane P8. Further, as illustrated on a right side of FIG. 14, it is possible to project, on the shadowing object 20, an icon image 251 of a person carrying stuff and prompt the user to move the shadowing object 20. Further, as illustrated in FIG. 15, a filled rectangular image 252 may be projected on the projection plane P8 to notify the user of existence of the shadowing object 20.

Figure 16:
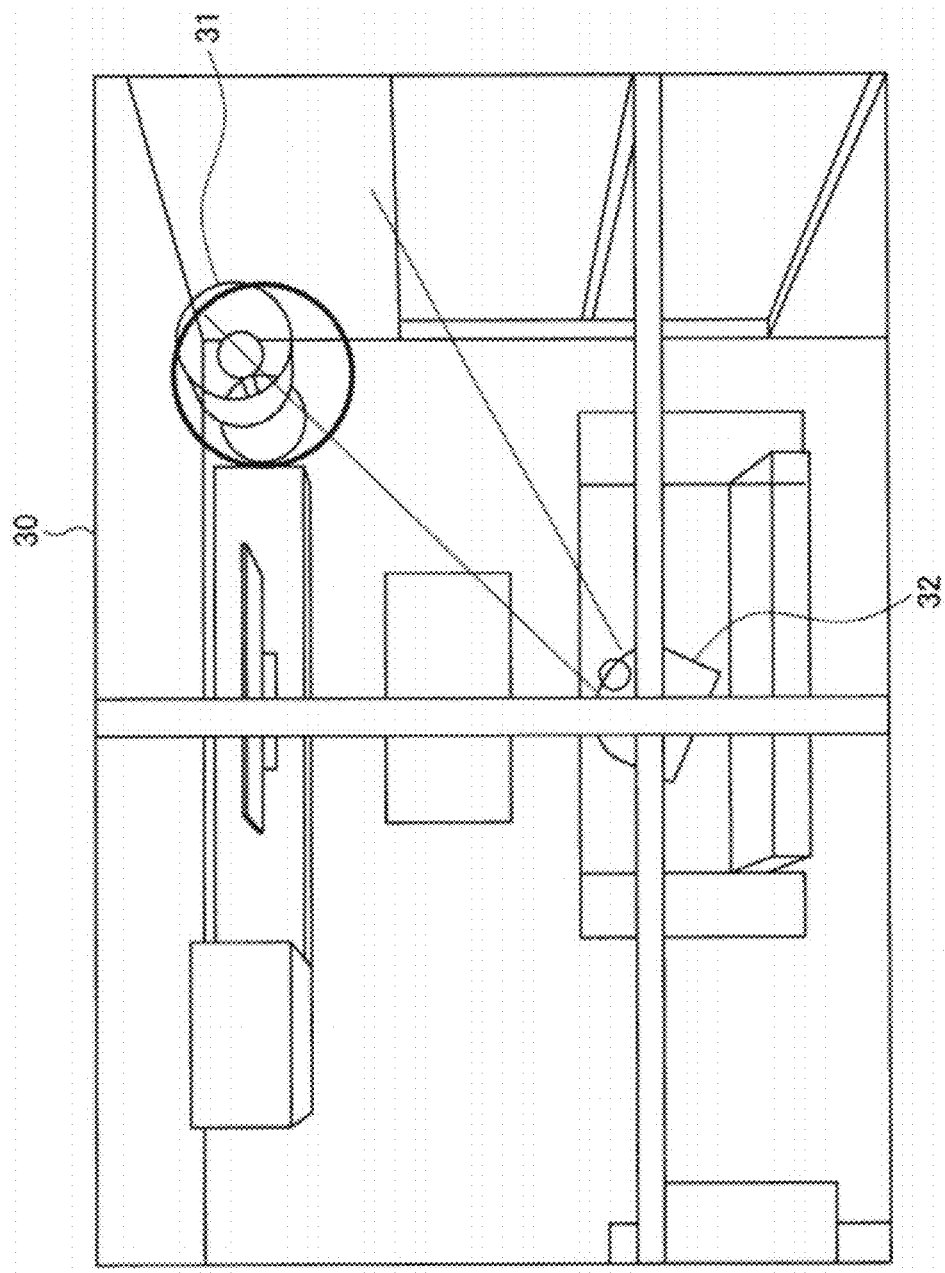
FIG. 16 is a diagram illustrating an example of an indoor overhead-view image to cause the user to exclude a shadowing object according to the present embodiment.

Further, as illustrated in FIG. 16, an indoor overhead-view image 30 may be projected in the direction of the line of sight of the user, or the like, and a projector position 32, a projector projection direction, and a shadowing object position 31 may be notified to the user.

Figure 17:
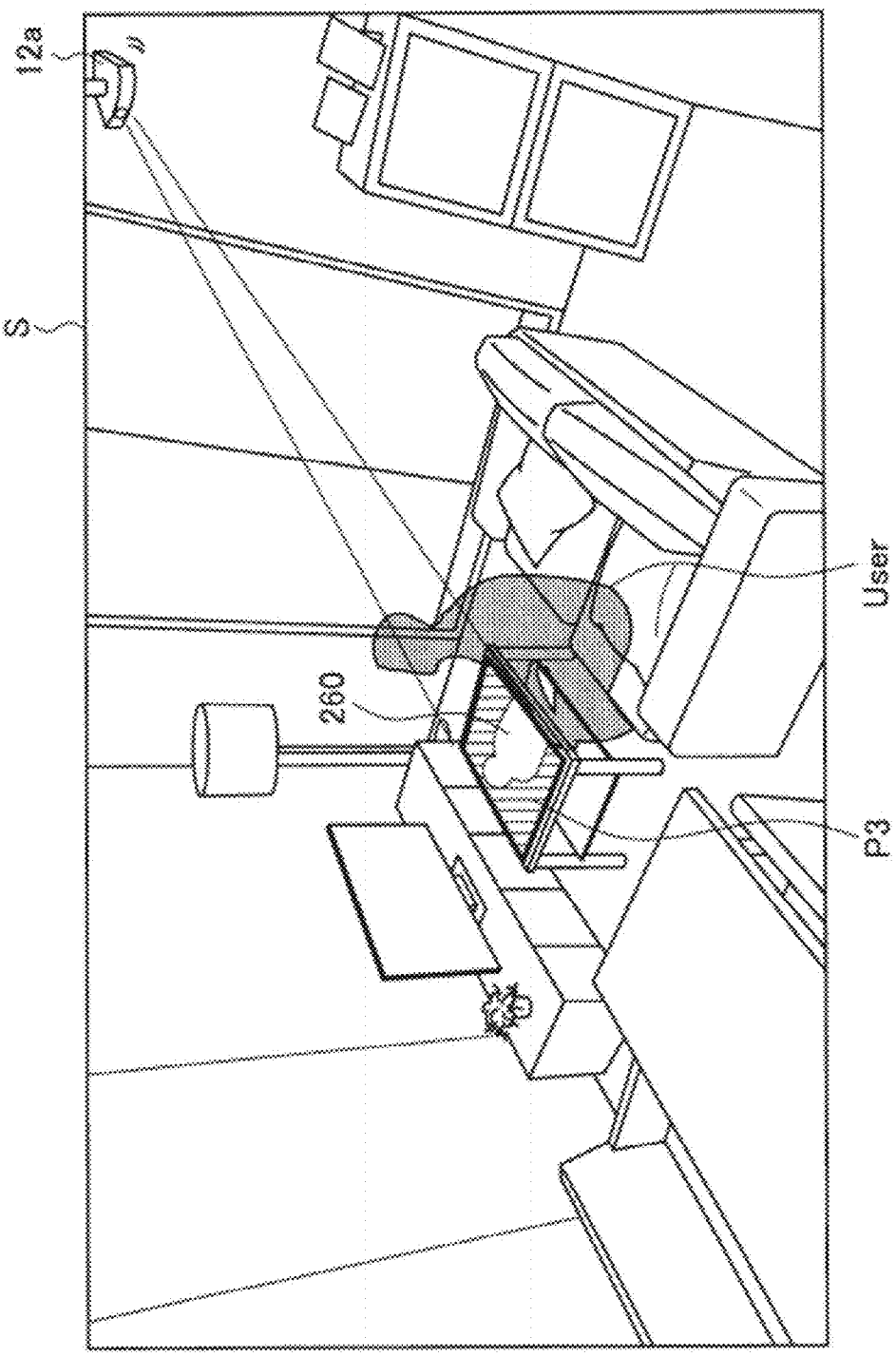
FIG. 17 is a diagram illustrating an example of an action inducement means in a case where the user himself/herself is a shadowing object according to the present embodiment.

FIG. 17 illustrates an example of an action inducement means in a case where the user himself/herself is a shadowing object. As illustrated in FIG. 17, for example, because a shadow 260 of the user is generated by projecting a filled rectangular image on the projection plane P3 from the projector 12a, the user can be notified that the user himself/herself is the shadowing object.

In this way, by explicitly indicate the shadowing object to the user, it is possible to cause the user to move the shadowing object (action inducement), and improve environment associated with an environmental factor.

Next, an example of a means of excluding an obstacle placed on the top of a table or the like will be described with reference to FIG. 18 and FIG. 19. For example, in a case where the projection area is the top of the table (refer to the projection planes P3 and P5 in FIG. 3), a predetermined projection image is displayed on the table to exclude the obstacle existing on the projection plane.

Figure 18:
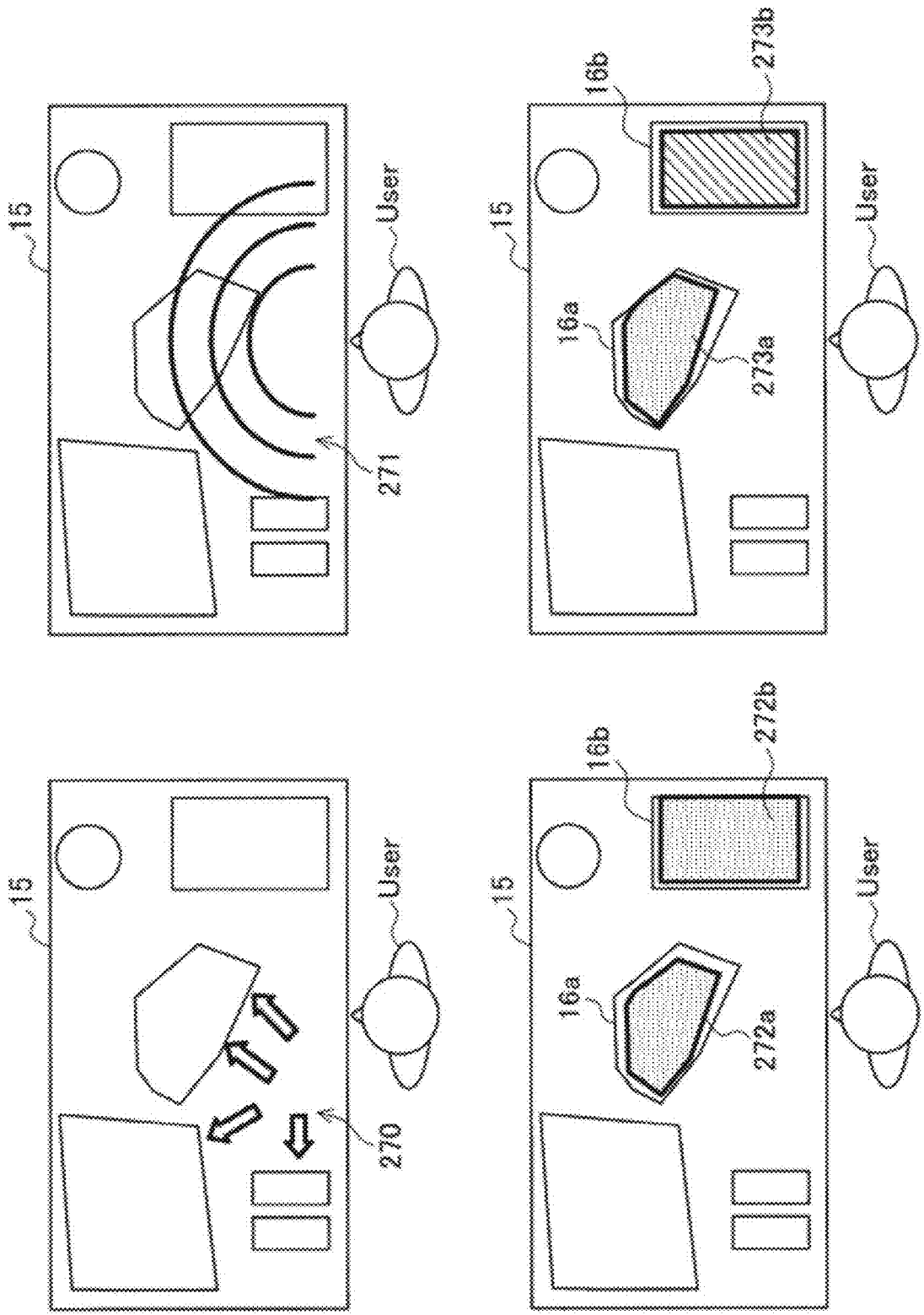
FIG. 18 is a diagram illustrating examples of projection images to cause the user to exclude obstacles existing on the projection plane according to the present embodiment.

For example, as illustrated in an upper part of FIG. 18, by projecting arrow images 270 or an animation image 271 resembling waves from a projectable area on a table 15 to a direction in which the obstacle exists, the obstacle to be excluded, moving of the obstacle, and a direction in which the projectable area should be expanded can be informed to the user.

Figure 20:
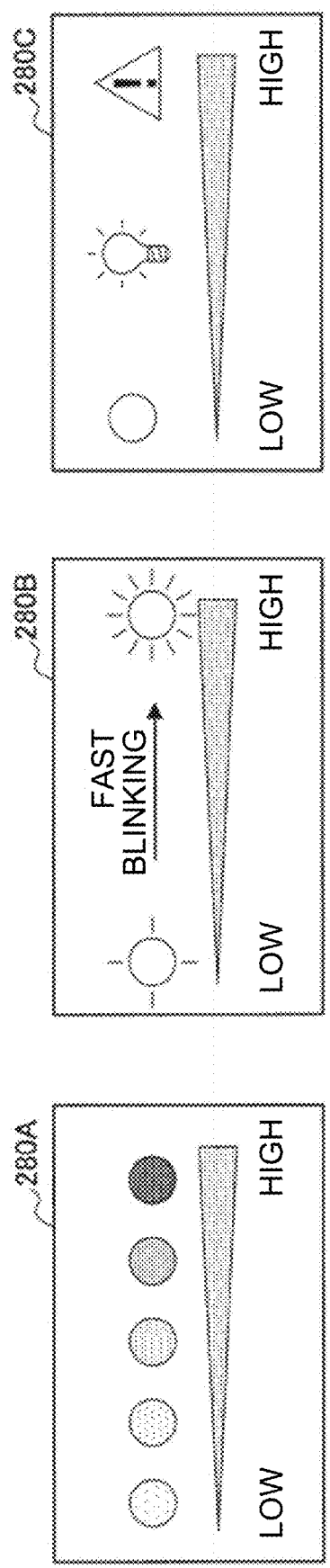
FIG. 20 is a diagram illustrating examples of expressing magnitude of an effect of the exclusion of an obstacle for a projection image superimposed on the obstacle according to the present embodiment.

Further, as illustrated in a left side of a lower part of FIG. 18, filled images 272a and 272b shaped to match forms of obstacles 16a and 16b are superimposed on the obstacles 16a and 16b, and the obstacles desired to be excluded can be explicitly presented to the user. Note that the filled images 272a and 272b may be displayed blinking. Further, as illustrated in a right side of a lower part of FIG. 18, color of images superimposed on the obstacles 16a and 16b may be changed according to magnitude of an effect. For example, a predetermined color is projected on an obstacle having a large effect (an obstacle that widens the projection area by being excluded). Further, in addition to the difference in the color, the difference in the magnitude of the effect may be expressed by changing transmittance or blinking speed. Further, the example of expressing the magnitude of the effect is not limited to this, and other expression methods may be used. Here, FIG. 20 illustrates examples of expressing the magnitude of the effect. As illustrated in FIG. 20, the examples include a color image 280A that expresses the magnitude of the effect by colors, an animation image 280B that expresses the magnitude of the effect by animation, and an icon image 280C that expresses the magnitude of the effect by icons.

Figure 19:
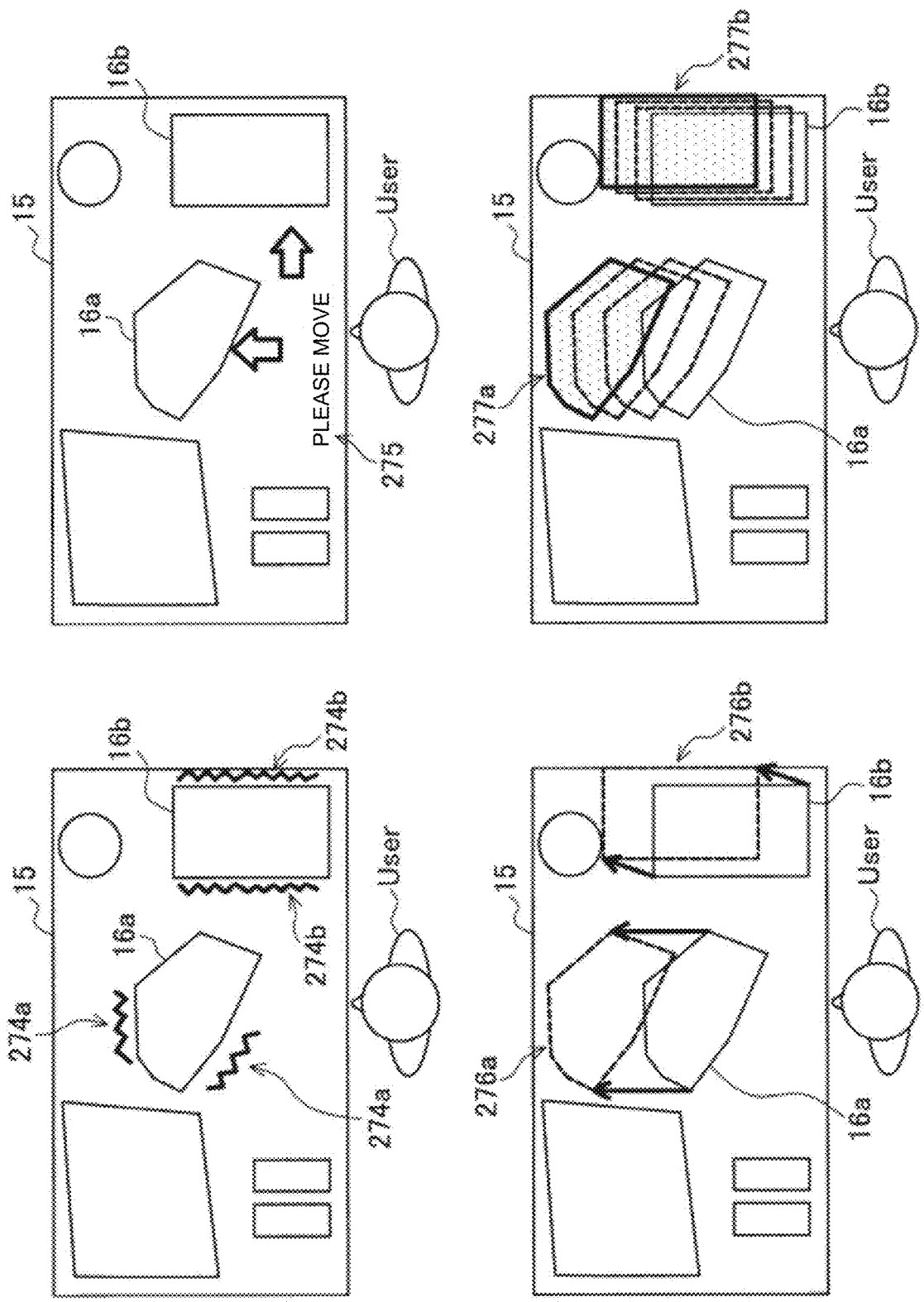
FIG. 19 is a diagram illustrating examples of projection images to cause the user to exclude the obstacles existing on the projection plane according to the present embodiment.

Further, as illustrated in a left side of an upper part of FIG. 19, emphasis expressions 274a and 274b by which obstacles appears to vibrate may be used, or as illustrated in a right side of an upper part of FIG. 19, an inducement image 275, by which the obstacles are explicitly presented by arrows and text, may be displayed.

Further, as illustrated in a left side of the lower part of FIG. 19, movement locus images 276a and 276b that present how far the obstacles should be moved may be indicated. In the movement locus images 276a and 276b, movement destinations of the obstacles are displayed by broken lines. Further, as illustrated in a right side of the lower part of FIG. 19, the movement destinations of the obstacles may be displayed by animation images 277a and 277b to present the movement destinations to the user.

In this way, by explicitly indicating, to the user, existence of an obstacle to be excluded and a direction in which the obstacle should be moved, it is possible to cause the user to move the obstacle (action inducement), and improve environment associated with an environmental factor.

Figure 21:
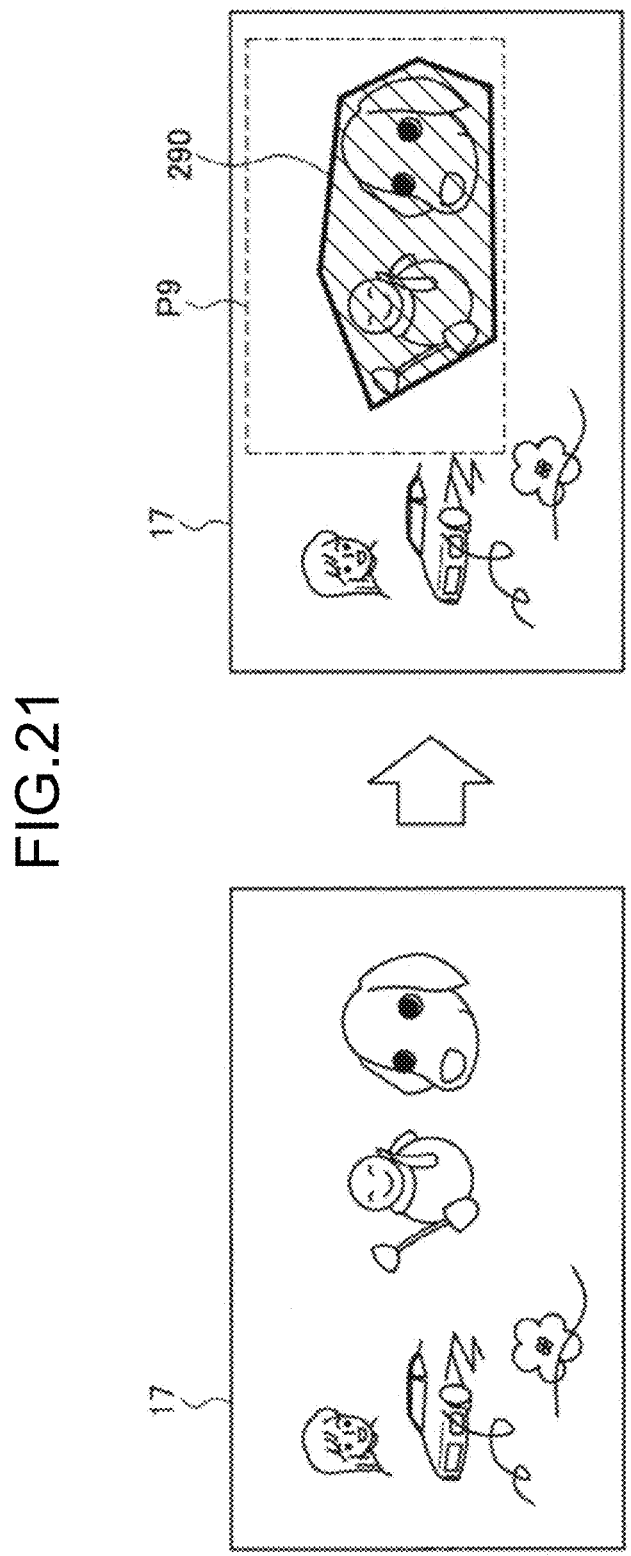
FIG. 21 is a diagram illustrating an example of an action inducement means to cause the user to erase a texture on a projection plane such as a whiteboard according to the present embodiment.

Further, it may be assumed that, even if the projection plane is a plane surface, there are many textures (a character, an illustration, or the like) on the projection plane such as a whiteboard on which a character is written. In this case, for example, as illustrated in FIG. 21, it is possible to project a filled image 290 on a textured part on a projection plane P9 on a whiteboard 17 or the like, and induce the user to erase the character written on the whiteboard.

Figure 22:
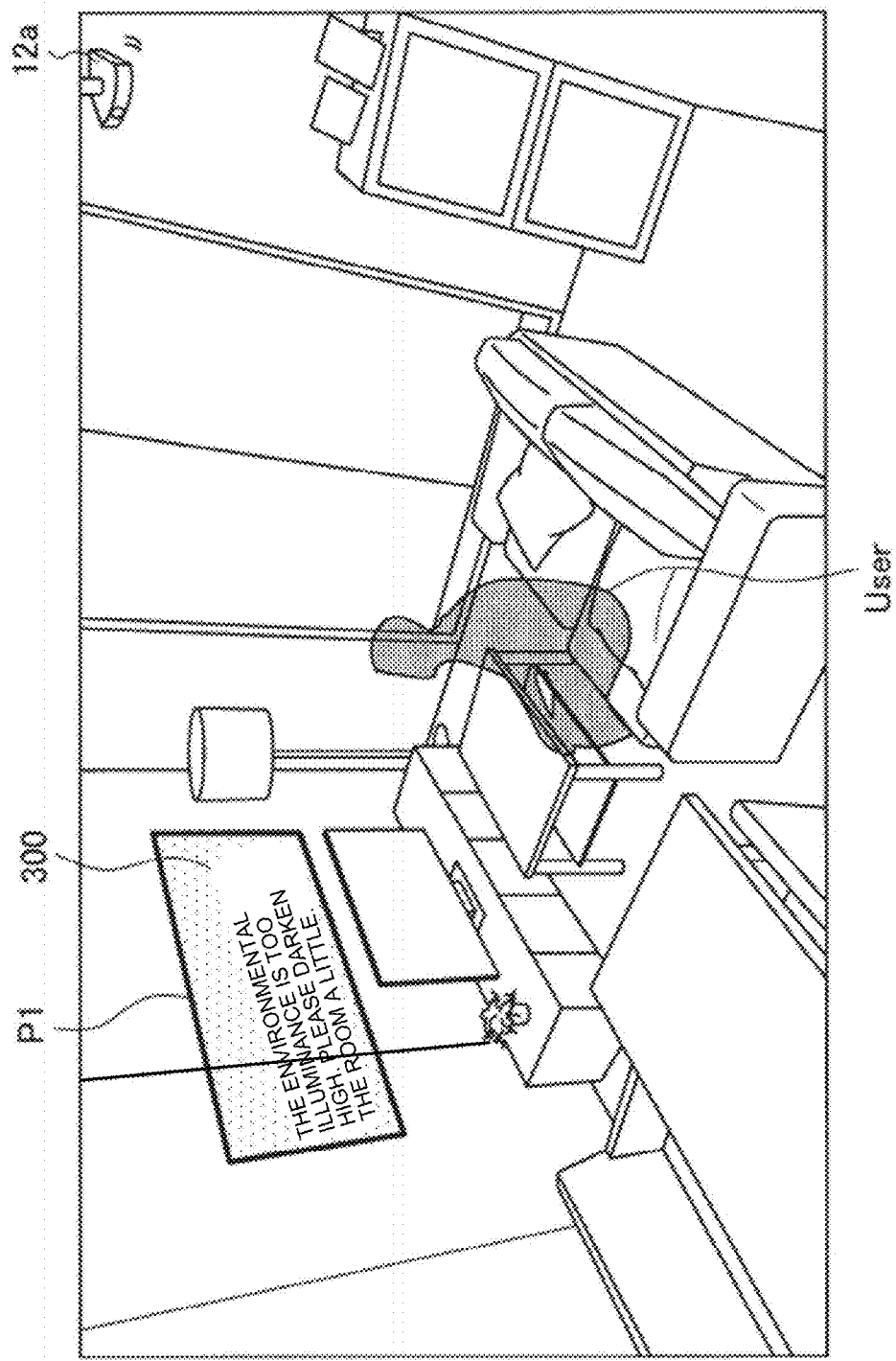
FIG. 22 is a diagram describing a case where the user is notified of inducement content by wording according to the present embodiment.

Further, a means of presenting inducing wording in the direction of the line of sight of the user may also be considered. For example, in a case of inducement content with low priority, the inducement content may be notified to the user, not explicitly but merely by presenting wording. FIG. 22 is a diagram describing a case where the user is notified of inducement content by wording. As illustrated in FIG. 22, for example, in a case where the projection plane P1 has bright environmental illuminance, a notification image 300 indicating wording for the user "The environmental illuminance is too high. Please darken the room a little." may be projected in the direction of the line of sight of the user.

Further, in addition to the display of the projection image as described above, presentation by audio may also be considered as an action inducement means. For example, in a case where priority in a category of the environmental illuminance is determined to be "high", and it is desired to cause the user to lower ambient light, voice saying "The surrounding brightness is too high. Please turn off the fluorescent light or close the curtain." may be output from the speaker 12b. Further, in a case where it is desired to cause the user to exclude an obstacle on the projection plane, voice saying "Please clear the table." may be output from the speaker 12b. Further, in a case where the projection area cannot be secured, voice saying "There is no location for projection. Please prepare a plane surface." may be output from the speaker 12b. Although the plane surface to be prepared is not particularly limited, a cutting board, for example, is assumed in a case of a kitchen. Further, in a case where it is desired to turn the user to the projection location, voice saying "The UI will be displayed at the lower left." may be output from the speaker 12b.

Note that these audio presentations may be performed together with inducement by the projection images described with reference to FIG. 9 to FIG. 20.

<3-2. Notification Means Decision Processing>

Next, among the projection control processing described with reference to FIG. 5, notification means processing shown in Step S115 will be specifically described with reference to FIG. 23 and FIG. 24. With respect to the notification means, as illustrated in FIG. 6 and FIG. 7, there is a case where a plurality of notification means (image presentation (projection display) and audio) is set for one item. The information processing device 10 may decide a notification means to be adopted, for example by first decision processing or second decision processing described below.

(3-2-1. Notification Means Decision Processing According to User State)

Figure 23:
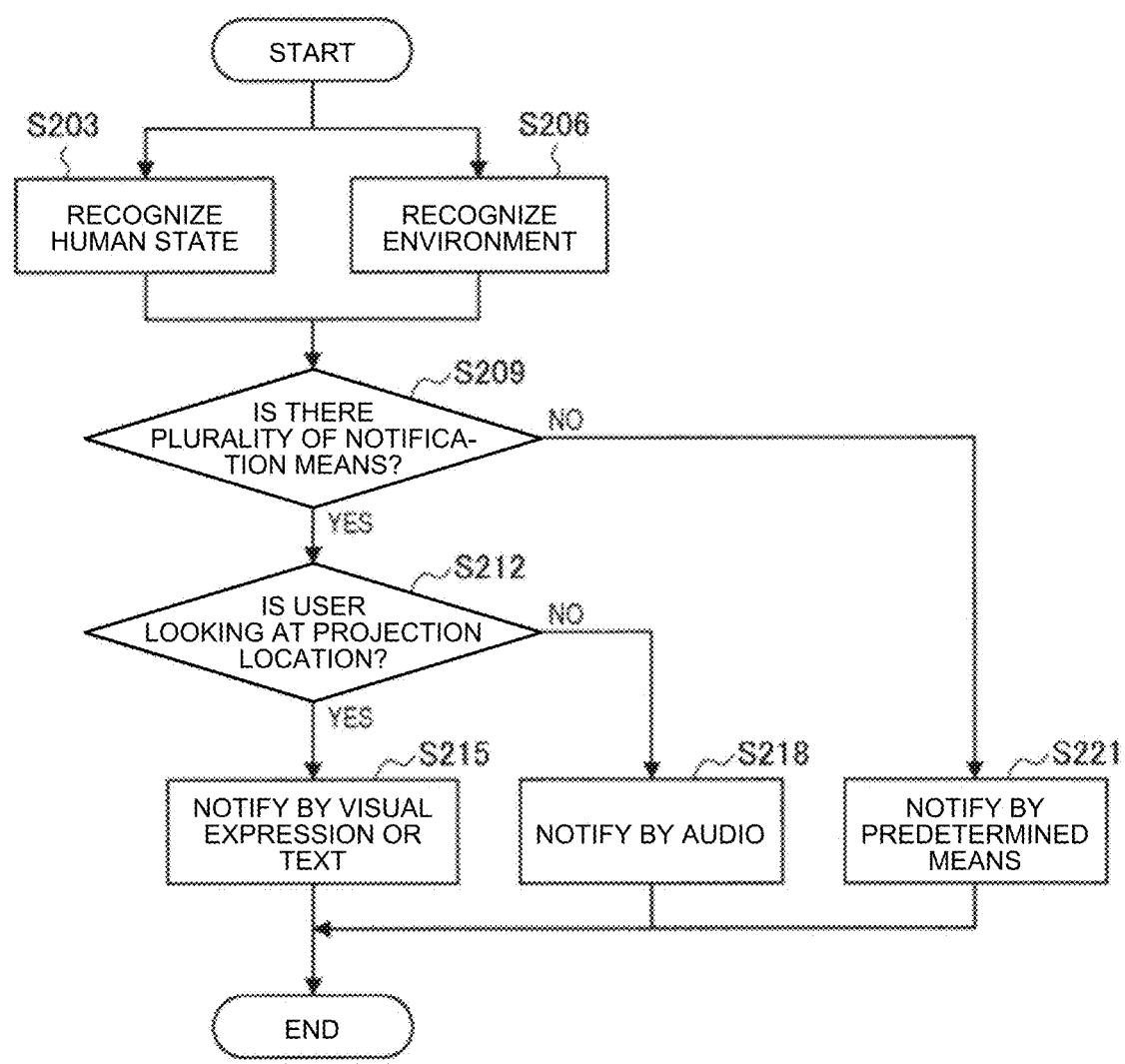
FIG. 23 is a flowchart illustrating notification means decision processing according to a user state according to the present embodiment.

FIG. 23 is a flowchart illustrating notification means decision processing according to the user state according to the present embodiment. As illustrated in FIG. 23, first, the recognition unit 101 of the information processing device 10 performs human state recognition (Step S203) and environment recognition (Step S206) on the basis of the sensor data.

Next, the inducement control unit 104 of the information processing device 10 decides whether or not there is a plurality of notification means associated with user inducement content decided in Step S112 illustrated in FIG. 5 (Step S209).

Next, in a case where there is a plurality of notification means (Step S209/Yes), the inducement control unit 104 decides, on the basis of the human state recognition result, whether or not the user is looking at the projection location (Step S212).

Next, in a case where the user is looking at the projection location (Step S212/Yes), the inducement control unit 104 adopts a notification means by visual expression or text (projection image display) (Step S215).

On the other hand, in a case where the user is not looking at the projection location (Step S212/No), the inducement control unit 104 adopts a notification means by audio (Step S218).

Further, in a case where there is a single notification means (Step S209/No), the inducement control unit 104 performs notification with the one predetermined means which has been set (Step S221).

In this way, the inducement control unit 104 may decide which notification means is to be used, the notification means by image display or the notification means by audio, depending on whether or not the user is looking at the projection location.

(3-2-2. Notification Means Decision Processing According to Environmental Sound)

Figure 24:
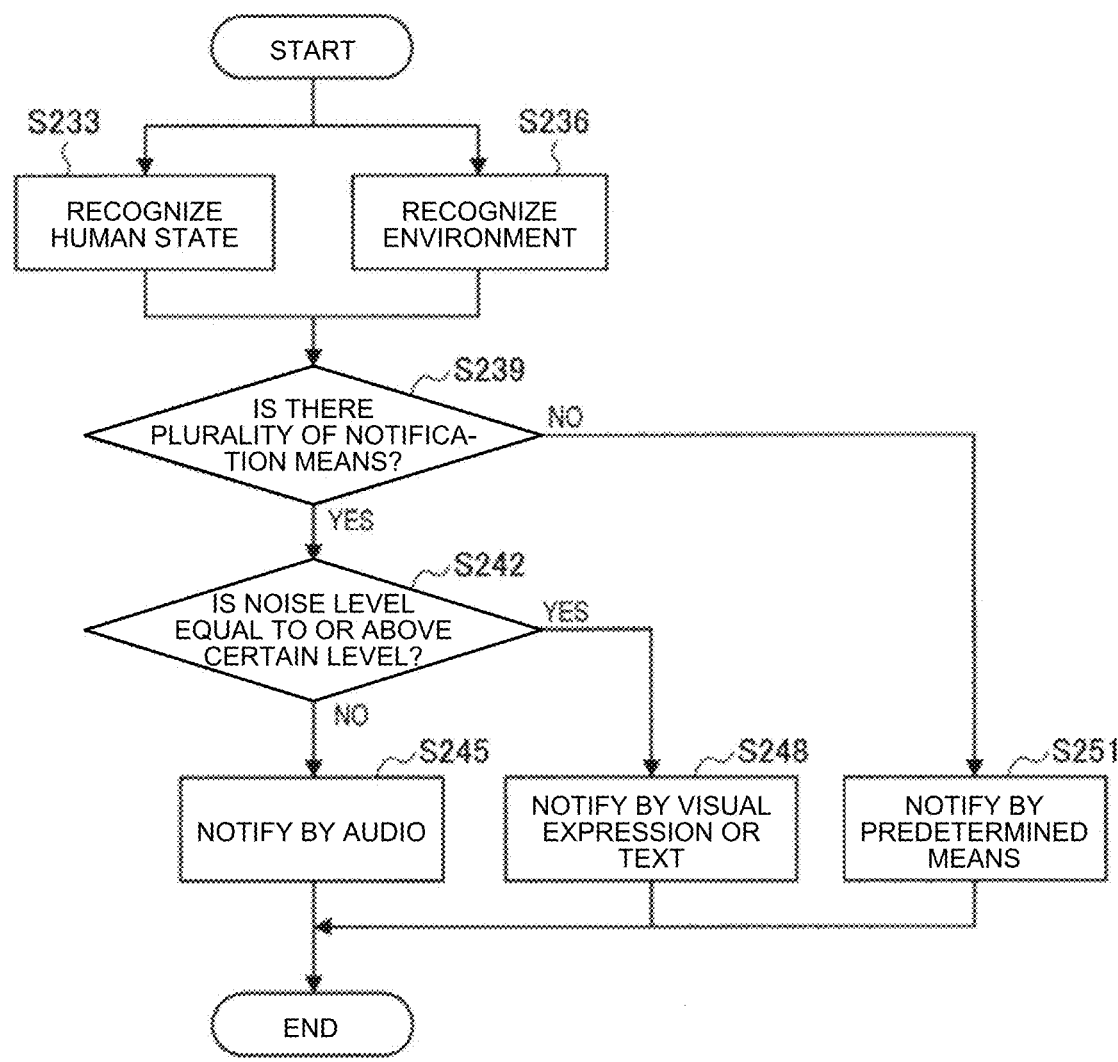
FIG. 24 is a flowchart illustrating notification means decision processing according to an environmental sound according to the present embodiment.

FIG. 24 is a flowchart illustrating notification means decision processing according to an environmental sound according to the present embodiment. As illustrated in FIG. 24, first, the recognition unit 101 of the information processing device 10 performs human state recognition (Step S233) and environment recognition (Step S236) on the basis of the sensor data.

Next, the inducement control unit 104 of the information processing device 10 decides whether or not there is a plurality of notification means associated with the user inducement content decided in Step S112 illustrated in FIG. 5 (Step S239).

Next, in a case where there is a plurality of notification means (Step S239/Yes), the inducement control unit 104 decides whether or not a noise level is equal to or above a certain level on the basis of the environment recognition result (Step S242).

Next, in a case where the noise level is not equal to or above the certain level (Step S242/No), the inducement control unit 104 adopts a notification means by audio (Step S245).

On the other hand, in a case where the noise level is equal to or above the certain level (Step S245/Yes), the inducement control unit 104 adopts a notification means by visual expression or text (projection image display) (Step S248).

Further, in a case where there is a single notification means (Step S239/No), the inducement control unit 104 performs notification with the one predetermined means which has been set (Step S251).

In this way, the inducement control unit 104 may decide which notification means is to be used, the notification means by image display or the notification means by audio, by deciding whether or not an environment allows the user to recognize audio.

4. Application Examples

<4-1. About Notification Means>

In the present embodiment, the notification means is projection of an image or wording by the projector 12a or presentation by audio from the speaker 12b. However, the notification means may be, for example, notification to a terminal such as a smartphone held by an individual. Further, notification may be performed in combination with a device (used by being gripped by a user, such as a remote controller) on which a vibrator to generate a tactile sensation is mounted. Thus, notification using tactile information is also possible.

<4-2. Eyewear Device>

In the present embodiment, the user is induced to take an action to ensure visibility of an image. In the present embodiment, image display by the projector 12a is taken as an example. However, the present embodiment is not limited to this, and can be applied to a case of viewing and listening content with a glasses-type device. The glasses-type device is a device in which a transmission type display is mounted on eyeglasses, and content in which AR is superimposed on the real world is viewed and listened through the display. In this case, the visibility is affected by the same factors as in the above-described example, such as environmental illuminance, an angle between the user and a location on which AR is superimposed, a shadowing object on a way to the location on which AR is superimposed, or an obstacle on the location on which AR is superimposed. Therefore, the notification of the action inducement to the user according to the present embodiment can be similarly applied to a case of using an eyewear device.

<4-3. Application to Use Case of Parking>

In the present embodiment, a user action is induced to achieve an optimal projection environment for the user. However, image expression using such inducement may also be applied as a means of inducing the user to an optimal location, such as car parking. For example, in a case where it is possible to recognize that "It is better to move to the right a little more.", or the like from a result of parking by a user, inducement may be performed by presenting a movement destination on the ground or on a monitor in a car.

<4-4. Linking Display Devices>

In the present embodiment, a system assuming a drive-type projector is constructed. However, the system may be constructed by using a TV device, a tablet terminal, or the like as a display location (projection plane). In other words, a display screen of an image output device such as a tablet or a TV device may be detected as an image output area, in a similar manner as the projection plane is detected. In this case, in this system, information about arrangement and a posture of each display device, a screen size, or the like is acquired as information related to the projection plane.

<4-5. In Case where there is a Plurality of People>

A plurality of users may be targets of this system. For example, in a case where wording is presented in directions of lines of sight of users, an area in which field of views overlap may be calculated from directions of lines of sight of a plurality of people, and the wording may be presented at the area. Further, also in expression of moving a projection image of a spotlight, an initial display position may be calculated from the above-described area in which the field of views of a plurality of users overlap.

5. Conclusion

As described above, the information processing system according to the embodiment of the present disclosure can prompt the user to take an action to improve the projection environment.

Although the preferred embodiment of the present disclosure has been described above in detail with reference to the appended drawings, the present technology is not limited to this example. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

For example, it is possible to create a computer program to cause hardware such as a CPU, a ROM, or a RAM included in the above-described information processing device 10, sensor 11, or output device 12 to demonstrate functions of the information processing device 10, the sensor 11, or the output device 12. Further, a computer-readable storage medium storing the computer program is also provided.

Further, the effects described in this specification are merely explanatory or exemplary effects, and are not limitative. That is, with or in place of the above-described effects, the technology according to the present disclosure may achieve any other effects that are obvious for a person skilled in the art from description of this specification.

Note that the present technology can also have the following configurations.

(1)

An information processing device comprising:

a recognition unit that recognizes a projection environment in space on the basis of sensor data obtained by sensing the space in which content is projected; and an inducement control unit that presents, to a user, inducement information to change a state of the projection environment from the recognized first projection environment state to a second projection environment state with improved visibility.

(2)

The information processing device according to (1), wherein the inducement information is an action that the user is prompted to take to change a human factor or an environmental factor that affects the visibility.

(3)

The information processing device according to (2), wherein the human factor is a viewing/listening distance, posture, a state, an angular difference from a projection plane, or a direction of a line of sight of the user, or a viewing/listening position of the user.

(4)

The information processing device according to (2), wherein the environmental factor is a shadowing object around a projection plane, an obstacle on the projection plane, reflection of the projection plane, color of or, a character or a diagram on the projection plane, environmental illuminance, or an environmental sound.

(5)

The information processing device according to any one of (2) to (4), wherein the inducement control unit performs control such that the user is notified of the inducement information by audio, an image, or vibration.

(6)

The information processing device according to (5), further comprising an inducement decision unit that decides which notification means, by the audio or by the image, is to be used, according to a human state or an environmental sound.

(7)

The information processing device according to any one of (1) to (5), wherein the information processing device calculates evaluation values of a factor related to a human state and each factor related to environment on the basis of the sensor data, calculates priority of inducement content linked to each of the factors on the basis of the evaluation values, and decides an inducement content according to the priority.

(8)

The information processing device according to any one of (1) to (7), wherein the inducement control unit changes a line of sight of the user by moving a projection image from a direction of the line of sight of the user to a projection location.

(9)

The information processing device according to any one of (1) to (7), wherein the inducement control unit prompts, by displaying a projection image at a viewing/listening position, the user to take an action of moving.

(10)

The information processing device according to any one of (1) to (7), wherein the inducement control unit prompts, by explicitly indicating a shadowing object by using a projection image, the user to take an action of excluding the shadowing object.

(11)

The information processing device according to any one of (1) to (7), wherein the inducement control unit prompts, by explicitly indicating an obstacle on a projection plane by a projection image, the user to take an action of excluding the obstacle.

(12)

The information processing device according to any one of (1) to (7), wherein the inducement control unit prompts, by superimposing a projection image on a texture on a projection plane, the user to take an action of erasing the texture.

(13)

The information processing device according to any one of (1) to (7), wherein the inducement control unit performs control such that inducing wording is displayed in a direction of a line of sight of the user.

(14)

An information processing method comprising, by a processor: recognizing a projection environment in space on the basis of sensor data obtained by sensing the space in which content is projected; and presenting, to a user, inducement information to change a state of the projection environment from the recognized first projection environment state to a second projection environment state with improved visibility.

(15)

A program for causing a computer to function as: a recognition unit that recognizes a projection environment in space on the basis of sensor data obtained by sensing the space in which content is projected, and an inducement control unit that presents, to a user, inducement information to change a state of the projection environment from the recognized first projection environment state to a second projection environment state with improved visibility.

REFERENCE SIGNS LIST

1 Information processing system
10 Information processing device
11 Sensor
11a Camera
11b Distance sensor
11c Illuminance sensor
11d Microphone
12 Output device
12a Projector
12b Speaker
100 Control unit
101 Recognition unit
102 Projection area decision unit
103 Action inducement decision unit
104 Inducement control unit
105 Projection control unit
110 Communication unit
120 Input unit
130 Storage unit

The invention claimed is:

1. An information processing device, comprising:
a recognition unit configured to recognize a first projection environment state of a projection environment in space based on sensor data obtained by sensing the space in which content is projected;
an inducement decision unit configured to calculate a priority of inducement information associated with a factor of a human state and a factor of an environmental state, wherein
the inducement information is different from the projected content,
the inducement information is a notification that prompts a user action from a user, and
the user action changes at least one of the human state or the environmental state that affects a visibility of the projected content; and
an inducement control unit configured to present, to the user, the inducement information to change a state of the projection environment from the recognized first projection environment state to a second projection environment state, wherein
the inducement information is presented based on the priority of the inducement information, and the visibility of the projected content in the second projection environment state is higher than the visibility of the content in the first projection environment state.

2. The information processing device according to claim 1, wherein the human state is at least one of a viewing or listening distance of the user from a projection plane, a posture of the user, a state of the user, an angular difference from the projection plane, a direction of a line of sight of the user, or a viewing or listening position of the user.

3. The information processing device according to claim 1, wherein the environmental state is at least one of a shadowing object around a projection plane, an obstacle on the projection plane, a reflection of the projection plane, at least one of a color, a character, or a diagram on the projection plane, an environmental illuminance, or an environmental sound.

4. The information processing device according to claim 1, wherein the inducement control unit is further configured to present the inducement information to the user via at least one of an audio, an image, or a vibration.

5. The information processing device according to claim 4, wherein the inducement decision unit is further configured to determine a notification mode, based on one of the audio or the image, to present the inducement information to the user.

6. The information processing device according to claim 1, wherein the inducement decision unit is further configured to:
calculate evaluation values of the factor associated with the human state and the factor associated with the environmental state, wherein the evaluation values are calculated based on the sensor data; and
decide the inducement information, of at least one factor from the factor associated with the human state and the factor associated with the environmental state, to be presented to the user based on the priority, wherein the priority of the inducement information is calculated based on the calculated evaluation values.

7. The information processing device according to claim 6, wherein an evaluation value of the factor associated with the environmental state corresponds to an amount of reduction in a projection area of the content.

8. The information processing device according to claim 1, wherein the inducement control unit is further configured to move a projection image from a direction of a line of sight of the user to a projection location.

9. The information processing device according to claim 1, wherein the inducement control unit is further configured to prompt, based on display of a projection image at a viewing or listening position, the user action.

10. The information processing device according to claim 1, wherein the inducement control unit is further configured to prompt, based on indication of a shadowing object in a projection image, the user action to exclude the shadowing object.

11. The information processing device according to claim 1, wherein the inducement control unit is further configured to prompt, based on explicit indication of an obstacle on a projection plane in the space of a projection image, the user action to exclude the obstacle.

12. The information processing device according to claim 1, wherein the inducement control unit is further configured to prompt, based on superimposition of a projection image on a texture on a projection plane, the user action to erase the texture.

13. The information processing device according to claim 1, wherein the inducement control unit is further configured to control display of the inducement information in a direction of a line of sight of the user.

14. An information processing method, comprising, by a processor:
recognizing a first projection environment state of a projection environment in space based on sensor data obtained by sensing the space in which content is projected;
calculating a priority of inducement information associated with a factor of a human state and a factor of an environmental state, wherein
the inducement information is different from the projected content,
the inducement information is a notification that prompts a user action from a user, and
the user action changes at least one of the human state or the environmental state that affects a visibility of the projected content; and
presenting, to the user, the inducement information to change a state of the projection environment from the recognized first projection environment state to a second projection environment state, wherein
the inducement information is presented based on the priority of the inducement information, and
the visibility of the projected content in the second projection environment state is higher than the visibility of the content in the first projection environment state.

15. A non-transitory computer-readable medium having stored thereon, computer-executable instructions which, when executed by a processor, cause the processor to execute operations, the operations comprising:
recognizing a first projection environment state of a projection environment in space based on sensor data obtained by sensing the space in which content is projected,
calculating a priority of inducement information associated with a factor of a human state and a factor of an environmental state, wherein
the inducement information is different from the projected content,
the inducement information is a notification that prompts a user action from a user, and
the user action changes at least one of the human state or the environmental state that affects a visibility of the projected content; and
presenting, to the user, the inducement information to change a state of the projection environment from the recognized first projection environment state to a second projection environment state, wherein
the inducement information is presented based on the priority of the inducement information,
the visibility of the projected content in the second projection environment state is higher than the visibility of the content in the first projection environment state.

* * * * *